United States Patent
Ochi-Okorie

(10) Patent No.: US 10,783,797 B1
(45) Date of Patent: Sep. 22, 2020

(54) STRUCTURED AND IMMERSIVE APPROACH FOR RAPID DISSEMINATION OF APPLIED KNOWLEDGE

(71) Applicant: Chidiebere Ochi-Okorie, Dickinson, TX (US)

(72) Inventor: Chidiebere Ochi-Okorie, Dickinson, TX (US)

( * ) Notice: Subject to any disclaimer, the term of this patent is extended or adjusted under 35 U.S.C. 154(b) by 1403 days.

(21) Appl. No.: 13/954,972

(22) Filed: Jul. 30, 2013

Related U.S. Application Data

(60) Provisional application No. 61/678,114, filed on Aug. 1, 2012.

(51) Int. Cl.
G09B 5/00 (2006.01)
G09B 23/00 (2006.01)
G09B 23/02 (2006.01)
G06F 3/0481 (2013.01)

(52) U.S. Cl.
CPC .......... *G09B 5/00* (2013.01); *G06F 3/0481* (2013.01); *G09B 23/00* (2013.01); *G09B 23/02* (2013.01)

(58) Field of Classification Search
CPC . G09B 19/00; G09B 5/00; G09B 5/02; G09B 5/06; G09B 23/00; G09B 23/02; G06Q 10/10; G06Q 30/0207; G06Q 30/0217; G06Q 30/0253; G06F 3/0481
USPC ......................................... 434/188, 323, 350
See application file for complete search history.

(56) References Cited

U.S. PATENT DOCUMENTS

| | | | |
|---|---|---|---|
| 2007/0166672 A1* | 7/2007 | Morita et al. ................. | 434/118 |
| 2010/0209901 A2* | 8/2010 | Soldavini et al. ............ | 434/350 |
| 2012/0064500 A1* | 3/2012 | Waitzkin et al. ............. | 434/350 |
| 2012/0156667 A1* | 6/2012 | Singer ...................... | G09B 5/00 434/350 |

OTHER PUBLICATIONS

Guran-Postlethwaite et al., "Web-Based Real Electronics Laboratories," 2005, American Society for Engineering Education.*

* cited by examiner

*Primary Examiner* — Eddy Saint-Vil

(57) ABSTRACT

Embodiments of the invention comprise approaches for streamlining and accelerating the communication of applied knowledge to end-users, particularly in science, technology, engineering, and mathematic (STEM) disciplines. Through a framework that leverages consistency and immersive teaching tools, complexity is substantially removed from the knowledge transfer process.

21 Claims, 18 Drawing Sheets

STRUCTURED AND IMMERSIVE APPROACH FOR RAPID DISSEMINATION OF APPLIED KNOWLEDGE

STATEMENT REGARDING FEDERALLY SPONSORED RESEARCH OR DEVELOPMENT

Not Applicable

REFERENCE TO SEQUENCE LISTING, TABLE, OR APPENDIX

Not Applicable

BACKGROUND OF THE INVENTION

Embodiments of the invention dramatically mitigate unnecessary complexity in the process of learning and practicing STEM disciplines (science, technology, engineering, and mathematics). Knowledge and practical experience that would ordinarily be acquired in the course of hours may now be gained in a matter of minutes.

Beneficiaries of this new development are engineers, scientists, multidisciplinary innovators, students, and others to whom highly efficient exploration of new knowledge territory is important. This demographic regularly finds it necessary to answer important questions and understand critical concepts in a short amount of time.

This need for efficient knowledge transfer is exemplified by an industry chemist who seeks to design and build a specialized chemical sensor for a unique experiment. The chemist has need to understand what technology and design principles are available from the field of electrical engineering. In particular, in order to consider various research paths and stay within a funding budget and time constraints, the chemist requires information on various time and cost factors involved in practicing the electrical engineering principles that pertain to implementing the sensor. Other than obtaining the equivalent of a degree and practical experience in electrical engineering, the information sought by the chemist is not typically available from a single, organized, and concise source. Unfortunately, an electrical engineer of typical skill is reciprocally in the same situation as the chemist and is unable to quickly offer direction in this specialized chemistry application. A better alternative for the chemist is very rapid, experience-based training in specific and pertinent areas of electrical engineering. This efficiency-focused paradigm is the subject of the invention.

Upcoming is an examination of challenges that are prevalent in conventional approaches to knowledge transfer. Subsequently, solutions to these challenges, which are part of various embodiments of the invention, are presented.

A number of default practices in disseminating knowledge introduce frustrating complexity to the process of learning and applying STEM principles. These practices may be gathered under the umbrellas of information sequence and incompleteness. Below, we consider these two ideas in turn.

Information Sequence

Effective information sequence concerns presenting units of knowledge in a comprehensible order of precedence, where the effectiveness of this order is determined solely from the perspective of the target audience. A lack of effective information sequence is a major impediment to efficiently accessing and rapidly applying pertinent knowledge. An example is discussing a complex equation well before illustrating the underlying real-world concepts with diagrams, models, or other illustrative tools. What tends to be far more effective is to present the illustration first and then gradually develop the equation from concepts conveyed in the illustration. When information is (unintentionally) sequenced in reverse order, as in the above example, a good deal of confusion and frustration may result, with inordinate amounts of time expended by the audience in attempting to resolve the difficulty.

Perhaps the most common and most consequential form of poor information sequence is failure to adequately demonstrate the relevance of a body of knowledge before delving into its technical details. In-contrast, by establishing the importance of and building interest in what lays ahead, the audience remains engaged. An example of ineffective information sequencing is a scenario where an instructor presents to a lay audience the operating principles of an automobile. The instructor begins the lecture by introducing theories of thermodynamics. From the instructor's perspective, a foundation in these theories is good preparation for subsequent exploration of the Carnot cycle of a vehicle's engine. In actuality, however, this approach is likely to confuse and frustrate a practical audience that has neither interest in thermodynamic theories nor the necessary background to appreciate its potential value.

What would be immediately useful to this audience is a conceptual overview of the major tangible systems of a vehicle (engine, steering, gear, brakes, etc.), after which each system may then be explored in greater depth. To elaborate, after the overview, the basic operation of the engine may be examined with the aid of actual or virtual models. Afterward, the concept of Carnot cycles may be introduced as an explanation of the engine's inner workings. In turn, that discussion becomes an agent for sparking interest in the thermodynamic theories that explain the Carnot cycle. This latter sequence of information, in contrast to the instructor's former approach, more effectively teaches the subject. It starts with that which is already familiar to the audience and gradually proceeds into less familiar territory, all the while continually building interest for upcoming topics.

Incompleteness in Coverage

Incomplete coverage refers to significant omissions in presenting a topic. Crucial information necessary to understand or apply the concept is missing and no references are provided that specifically address the omissions. Important examples of incomplete coverage include unstated assumptions; oversimplifications that are presented authoritatively; interpretations presented as facts; lack of primary data for the audience to draw its own conclusions; lack of information on methods of derivation such as with formulae or equations; and lack of examples of practical applications to aid in understanding the principles in question. Problems arising from incomplete coverage include an inability on the part of the learner to understand the inner workings of presented concepts; an inability to recreate experiments results, phenomena, or works; and propagation of significant errors attributable to presented information that is untested or unverified during the learning process, but rather assumed to be true.

Impact on Effectiveness and Efficiency

A major consequence of poor information sequence and incomplete coverage is that frequently a significant portion of time expended in learning many STEM subjects goes toward nonproductive activities. Learning scenarios where eighty- to ninety-percent of self-educational effort derails into activities of little value are not unusual. Examples of distracting activities are searching other sources for key content not covered in the primary source of information; searching for diagrams or examples to illustrate vague concepts; reading long stretches of text or consuming other media in hopes of finding crucial information, only to discover that it is not present in that source; struggling to extract information from poorly written text with significant omissions or unstated assumptions; procrastination toward study arising from an unmotivated approach to presenting knowledge; and even simply staring at a page, perplexed.

In summary, gathering and extracting information in seeking to understand STEM principles can be highly and unnecessarily time-consuming. The situation is exacerbated when detailed, practical information is sought for implementing solutions in the real world, and knowledge of a general nature will not suffice. STEM literature and information media commonly undervalue the importance of providing a sense of cost and time commitments required for executing real-world applications. These traditional sources of information are not oriented toward enabling efficient first-hand observation and implementation. The current state of the art in STEM knowledge-transfer frequently poses major impediments to productive learning, particularly where this learning is aimed at problem-solving, multidisciplinary work, and innovation.

BRIEF SUMMARY OF THE INVENTION

Embodiments of the invention streamline the knowledge-transfer process through a framework for organizing and delivering the knowledge of a discipline. The result is dramatic reduction in the time (and costs) required to learn and implement a body of knowledge. In effect, the framework vastly improves upon information sequence and minimizes the problems of incomplete coverage. This framework may be likened to the various organizational features of a book such as the table of contents, chapter divisions, page numbers, and index that allow a reader to quickly and efficiently navigate the book. Once a reader understands this framework, it can be applied to a very large selection of books organized in this format. It is not necessary to learn a new set of navigation tools with each book.

In the same manner, one can learn once a framework for acquiring knowledge in STEM disciplines and then apply it routinely, thus minimizing the need to acclimate to new learning methods for each topic, presentation, or discipline. This framework comprises two structures: an inter-topic structure and an intra-topic structure.

DETAILED DESCRIPTION OF THE INVENTION

Glossary

Computer Device

Figure 1:
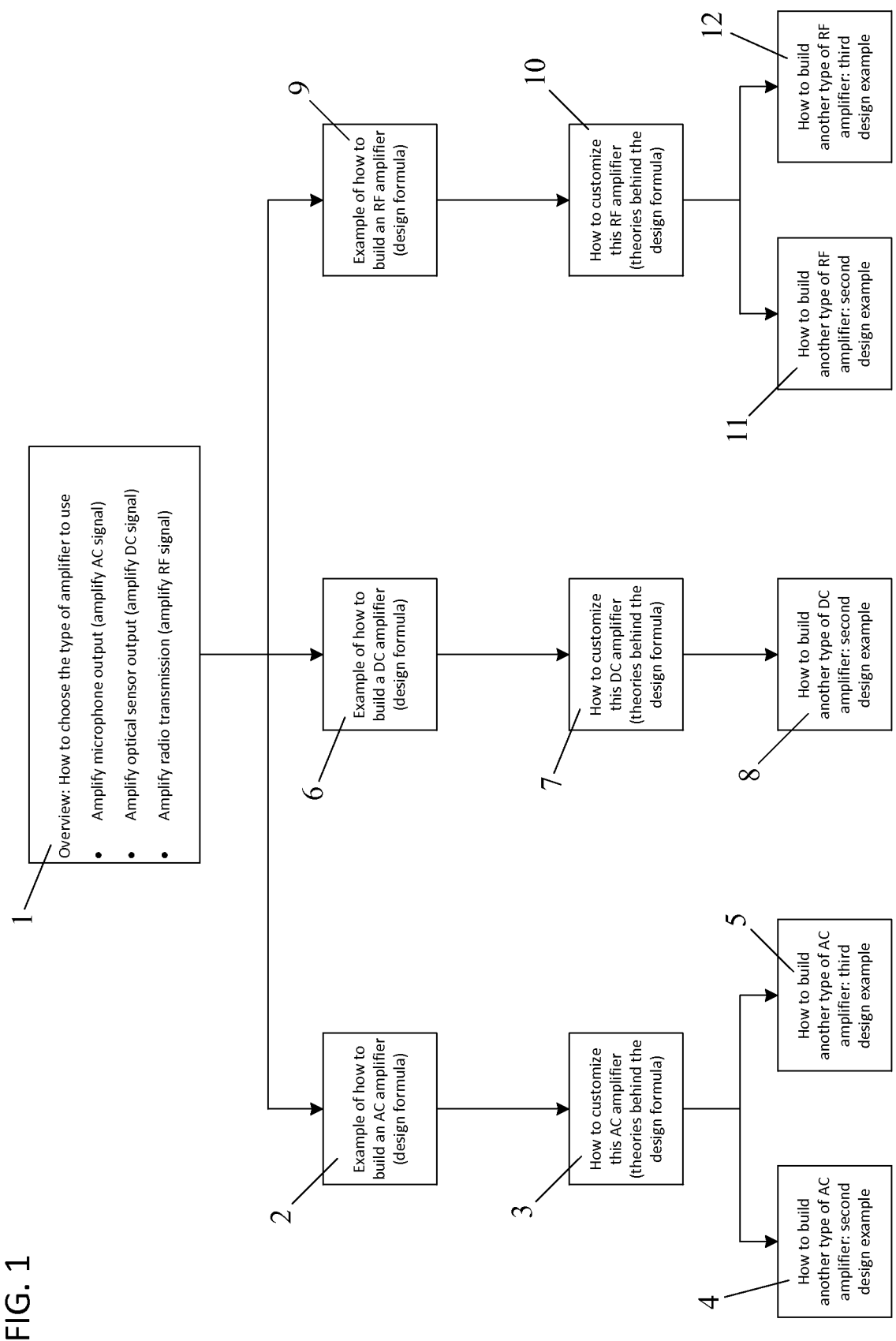
FIG. 1 illustrates several aspects of an inter-topic structure, using the subject of amplifiers in electrical engineering as an example.

A desktop computer, laptop, tablet, smart phone, personal digital assistant, workstation, or any of their equivalents having or connected to at least some of the following:
  a) A graphical display
  b) One or more user-interface devices such as a keyboard, mouse, touchscreen, touch pad, or their equivalents
  c) One or more speakers for delivering audio content
  d) A microphone for voice commands, audio recordings, sound analysis, and similar applications
  e) Camera or equivalent image-capture device
  f) Network hardware or its equivalents for connectivity to the internet or to an equivalent network Computer User-Interface One or a combination of the methods by which a user may interact with a computer device, those methods including but not limited to
  a) Viewing outputs on a graphical display
  b) Hearing outputs from a speaker
  c) Making inputs via a keyboard or its equivalents
  d) Making inputs via a mouse, pointer, or their equivalents
  e) Making inputs via a touchscreen, touchpad, or their equivalents
  f) Making inputs via a microphone
  g) Making inputs via a camera or equivalent image-capture device Project Resources Physical paraphernalia, hardware, physical tools, and/or physical consumable supplies for implementing or practicing projects Set of Project Resources The exact or substantially sufficient combination of project resources necessary for implementing or practicing one instance of a particular project Lesson Typically, a session of learning or the knowledge prepared for dissemination in this session Topic A concept or idea that is part of the knowledge of a discipline and ordinarily has one or more of the following physical manifestations in various embodiments of the invention:
  a) A title presented via a computer user-interface that briefly identifies the topic
  b) A graphical icon or image presented via a computer user-interface that identifies the topic
  c) A written or spoken description presented via a computer user-interface that summarizes the nature of the topic
  d) A lesson presented via a computer user-interface that teaches the topic Topic Category A class of one or more topics that pertain to a point of interest in a discipline and ordinarily has one or more of the following physical manifestations in various embodiments of the invention:
  a) A title presented via a computer user-interface that briefly identifies the topic category
  b) An icon or image presented via a computer user-interface that represents the types of topics within the topic category
  c) A written or spoken description presented via a computer user-interface that summarizes the nature of the topics in the topic category
  d) A grouping of topics that is presented via a computer user-interface and is distinguished from other groups of topics Multimedia Presentation Any presentation delivered via a computer-user interface and may include text, still images, interactive images, slideshows, video, and audio content.

Procurement

Purchasing, renting, reserving, or otherwise acquiring resources

Discipline

A field of study that is typically described by one or more of the following:
  a) In contrast to a random collection of topics, the topics of a discipline have a unifying purpose that is motivated by real-world interests
  b) A discipline has clearly identifiable core principles or root topics from which all other concepts in the discipline are derived or based Curriculum A process, or method, for teaching a body of knowledge where the process typically subdivides the body of knowledge into subject areas or groups of related topics Has Internet Presence Has one or more components that is available, publicized, presented, and/or delivered on the internet or an equivalent computer network Randomly Accessible Retrievable in any order, even if that order is not logical Summary of Framework To achieve the objective of an efficient, productive knowledge-transfer process, various embodiments of the invention implement a framework comprising two structures: an inter-topic structure and an intra-topic structure.

The Inter-Topic Structure

The inter-topic structure contributes toward addressing both problems of poor information sequence and incomplete coverage. It is a method of organizing the topics of a curriculum into an effective delivery sequence in order to ease comprehension and ease selection by the audience of pertinent topics from the curriculum. FIG. 1 illustrates some of the features of inter-topic structure. In some respects, FIG. 1 is similar to a table of contents in that it outlines the contents of a curriculum (in amplifiers). Each box in the figure displays the title of a topic in this curriculum. Inter-topic structure has four key characteristics: it is granular, application driven, relevance driven, and offers learner-centric topic categories for locating and accessing topics of interest in the curriculum. Details of these characteristics follow below.

Granularity

A granular topic structure breaks down concepts into the smallest practicable units and addresses each unit topic in a separate lesson or presentation. This approach eliminates complexity and allows the audience to focus on and master one concept at a time. Enhanced navigability is also now possible because a detailed listing of the finely partitioned topics can be provided in a map of the curriculum, similar in function to a table of contents. Learners are therefore able to pinpoint exact topics of interest in the curriculum.

Furthermore, a granular topic structure meticulously enumerates every relevant topic of a subject and thoroughly addresses each topic in a presentation, thereby offering comprehensive coverage of the subject. In this regard, granularity contributes toward solving the prevalent problem of incompleteness in STEM knowledge sources. FIG. 1 partially illustrates a granular approach to the subject of amplifiers in electrical engineering. The extent of this figure is abbreviated for simplicity. In actuality, the topic structure of FIG. 1 may easily contain a few hundred topics instead of a dozen 1-12 in order to comprehensively traverse all relevant concepts under the subject of designing amplifiers.

Application-Driven Topic Structure

In a curriculum with an application-driven topic structure, the teaching of topics is in terms of how to achieve specific objectives that are of interest to practitioners. Examples of titles for topics constructed in this manner are "how to build an audio amplifier" in electrical engineering, "how to design a gasoline-electric engine" in the field of mechanical engineering, and "how to synthesize organic molecules" in the study of organic chemistry. Topics 1-12 in FIG. 1 give further illustration of topic construction in the subject of electronic amplifiers.

In an application-driven topic structure, the presentation of a given topic to an audience proceeds by examining disciplinary principles via practical applications. Such presentation or lesson explores methods for achieving a meaningful objective or solving a real-world problem. The rationale for utilizing application-driven topic structures is a recognition that practitioners have specific goals in mind when they are drawn to a discipline. One person might take an interest in electrical engineering with the aim of learning how to build high-precision sound systems. Another might be drawn to mechanical engineering out of fascination with zero-emission vehicles. Yet another individual may pursue chemistry as a powerful tool for discovering cures for disease.

Application-driven lessons appear by far to be the most effective in generating high levels of interest in an audience because they directly address areas of curiosity. In contrast, a theory-first approach tends to alienate an audience with abstract information that is difficult to evaluate in relation to the audience's interests. Examples of comparatively theoretical topics are "MOSFET small-signal parameters" pertaining to audio-amplifier design and "atomic orbitals of carbon, hydrogen, and nitrogen" applicable to preparing organic chemicals. An audience may expend significant amounts of time in attempts to determine the relevance of these abstract topics, to find supplemental material for clarification, and/or to maintain motivation for continued study.

Very importantly, practitioners are able to quickly locate topics of interest in an application-driven topic structure. A map of the structure lists each lesson by a title or other annotation that indicates the application(s) that the lesson explores. By browsing this map, practitioners may conveniently locate those applications that are useful to their aims.

Relevance-Driven Topic Structure

A relevance-driven topic structure directly contributes toward solving the problem of poor information sequence. A well-defined audience is the basis for a relevance-driven topic structure. The objective of this structure is to determine the order in which the topics of a curriculum are presented to the audience. Suitably sequenced, the presentation of each topic to the audience is sufficiently preceded by lessons that teach prerequisite topics, if any. In this manner, the sequence of topics proceeds from what is already familiar to the audience to what is less familiar. Precedent topics provide context, preparation, and relevance to subsequent topics, as necessary. Along the same lines, the benefits of studying an unfamiliar topic are established in lessons traversed earlier in the topic sequence.

Figure 7:
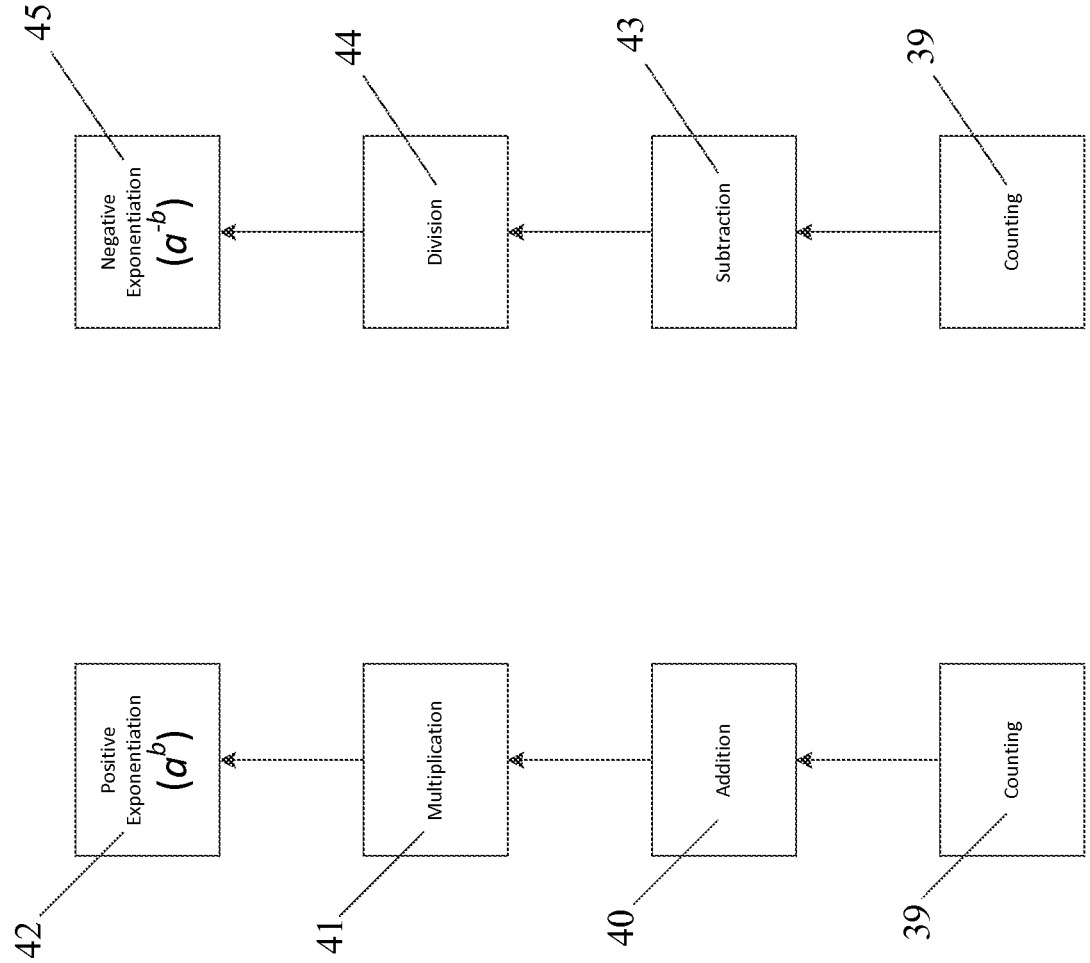
FIG. 7 aids in illustrating the concept of root topics in the field of mathematics.

In a relevance-driven topic structure, root topics explore the most basic concepts in the curriculum. All other topics successively build upon the root topics. FIG. 7 aids in illustrating this principle in the field of mathematics. The figure shows how six higher-level (more advanced) topics arise from the root topic of counting 39. These higher-level topics are: addition 40, multiplication 41, positive exponentiation 42, subtraction 43, division 44, and negative exponentiation 45. The first higher-level topic, addition, involves counting two quantities, a and b. The two quantities are then pooled together. This pool is counted to obtain the result c, where c=a+b. Hence by counting the three quantities a, b, and, c, one can perform and describe the process of addition. Counting, therefore, is the basis for addition.

Similarly, by counting three quantities a, b, and, c, one can perform subtraction. First, a quantity designated a is counted. A part of this quantity, designated b, is counted and discarded. The remaining quantity, designated c, is then counted such that the following expression describes the subtraction process: c=a−b. Hence, counting is also the basis for subtraction.

Multiplication is an even higher level concept, based directly on addition and ultimately on counting. For example, 3×4 means 4+4+4=12, that is, four added three times. Similarly, division has its basis in subtraction. The expression 12/4 can be performed by repeatedly subtracting 4 from an original pool of 12 until a quantity less than 4 is left: 12−4−4−4=0. Since 4 was subtracted three times to arrive at zero, the expression 12/4 has the result of 3.

Positive exponentiation, $a^b$, where a and b are both positive, builds upon multiplication. For example, $2^3$ means 2×2×2=8. Similarly, for negative exponentiation, $2^{-3}$ means 1÷2÷2÷2=0.125, or 1 successively divided by 2 three times. Ultimately, exponentiation arises from counting. So does essentially any mathematical concept, no matter how advanced. Hence, counting is a root topic in the study of mathematics.

Ordinarily, any discipline will have one or more independent root topics; and all other topics in the discipline can be traced back to one or more of these root topics. In the field of chemistry for example, root topics may include the periodic table, valence electrons, and bonding. In biology, the functioning of biomolecules such as water, RNA, DNA, and proteins may be examined in root topics. In electrical engineering, charge, impedance, and electromagnetic radiation are examples of possible root topics.

A relevance-driven topic structure shows or indicates the chain of topics that constitute a subject, starting from a higher-level topic(s) and proceeding all the way down to the applicable root topics. This feature enables learners to determine a suitable entry point into the curriculum based on their level of preparation. For example, if one wishes to learn positive exponentiation but only currently understands addition, she will need to first learn multiplication, as illustrated in FIG. 7.

As a matter of practicality and simplicity, a particular depiction of a topic structure may omit root topics and other precedent topics in order to focus on higher-level topics that are of interest. FIG. 1 illustrates such an abbreviated relevance-driven topic structure in electrical engineering. In this figure, lower-level (more rudimentary) topics like charge, voltage, current, resistance, capacitance, and transistors are not shown. The topics 1-12 in the diagram concern signal amplification. Lessons corresponding to these topics impart knowledge on designing and building several types of amplifiers.

Compared to FIG. 7, FIG. 1 is inverted such that topic 1 is the lowest-level topic and other topics are at a higher level (more advanced). Topic 1 is a broad overview of different types of amplifiers and their applications. This overview offers guidance on selecting specific categories of amplifiers for further exploration. AC amplifiers are one category of amplifiers in the figure and are covered by topics 2-5. Topics 6-8 teach about DC amplifiers; and topics 9-12 examine RF amplifiers. Based on the background information provided in the overview of topic 1, and depending on the practitioner's interest, the practitioner may now choose which subsequent topic to pursue, for example, AC amplifier design in topic 2. In effect, the overview 1 enables the practitioner to assess the relevance of the ensuing topics 2, 6, 9.

Continuing on the subject of AC amplifiers, a topic 3 that addresses customization considers the theories (mathematical models, device physics, etc.) that enable modification of the original amplifier design 2 for use in other applications. By linking coverage of theory with practical skills, as done in topic 3, the theory covered in topic 3 acquires relevance with respect to the tangible amplifier design of topic 2. In FIG. 1, two additional topics 4-5 introduce other AC amplifier designs 4-5. As with other topics in the diagram, they are organized in order of relevance: the preceding exposition of a particular AC amplifier 2-3 provides a foundation for exploring other AC amplifier designs.

Topic Categories

Figure 3:
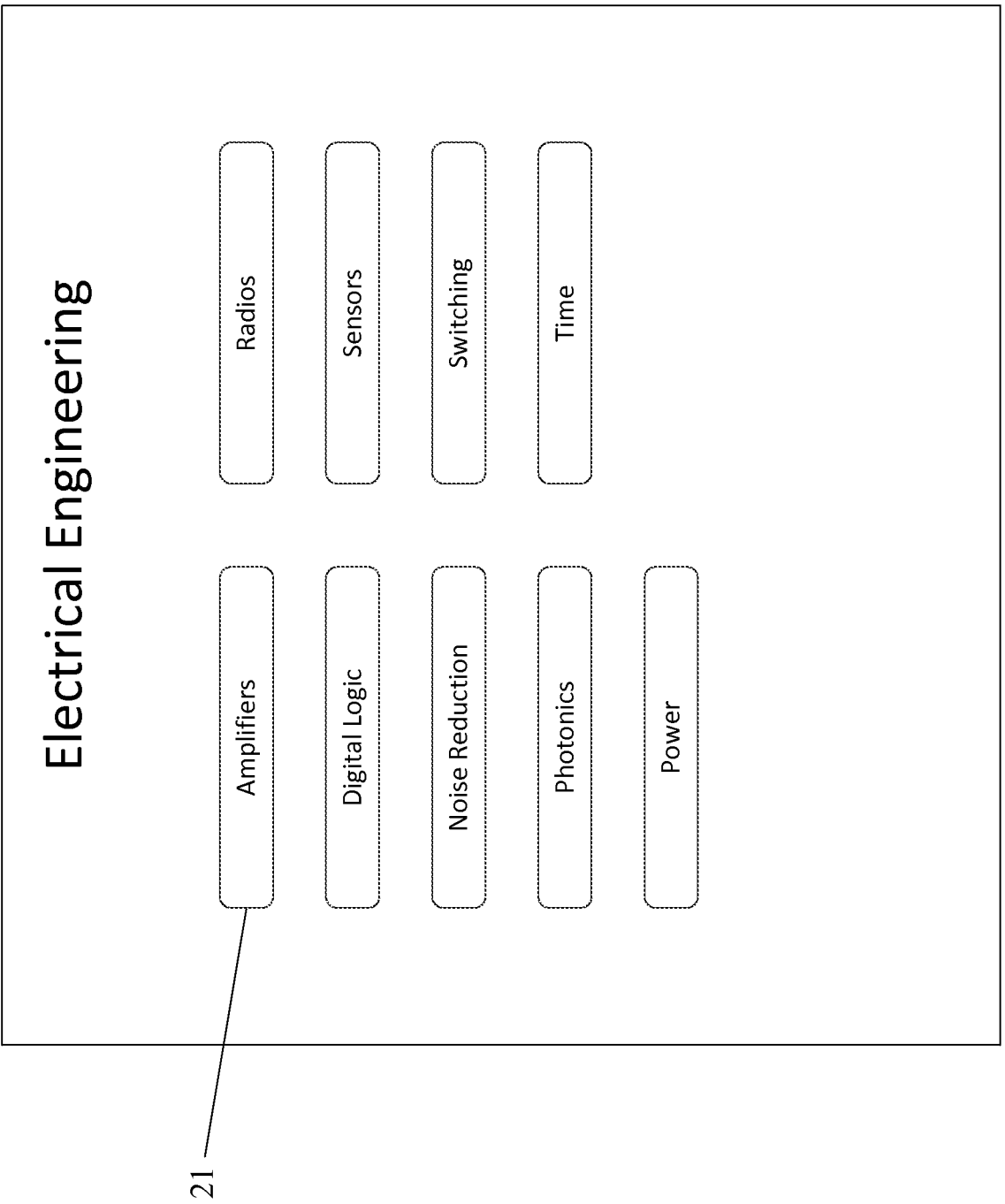
FIG. 3 is an example of discipline subdivision into disparate topic categories. In this example, some topic areas in electrical engineering are listed.

At a given time, learners are frequently interested only in a specific area of a discipline. That area may be relevant to a particular problem or objective which a learner wishes to address, or it may simply be an area of curiosity. Topic categories enable learners to quickly identify and access points of interest in a curriculum, thus freeing them from the necessity of traversing much of a curriculum in order to find the information desired. FIG. 3 provides an example of topic categories. These topic categories subdivide a curriculum in electrical engineering into several areas, thus permitting a learner to quickly narrow down the field of search. A learner interested in amplifier design may browse the Amplifiers topic category 21, for example. Under each topic category is one, several, or a large number of topics. All of FIG. 1 illustrates the types of topics that may be found under the Amplifiers topic category 21 in FIG. 3.

A book will ordinarily have one table of contents. However, if the book is prepared for multiple demographics, it can be useful to create the equivalent of separate tables of content for each target audience. Each table of content will list only the sections of the book that are relevant to its corresponding demographic, thus relieving each demographic of the inconvenience of wading through inapplicable topics. Overlap may exist between the tables of content where the different demographics have common interests.

The preceding paradigm is even more suited to an online curriculum. Such a curriculum may be subdivided into tailored sets of topic categories according to the interests of each learner or demographic. A user of an internet-delivered curriculum in electrical engineering may be presented with all the topics of FIG. 1 if he is generally interested in amplifiers. In another scenario where the user is specifically interested in a type of AC amplifier, he is presented with the topic category 46 in FIG. 8. The topics in this category are the same as topics 2 and 3 in FIG. 1. In a third scenario, the user wishes to understand DC amplifiers. The topic category 47 in FIG. 8 teaches this subject; and the topics in this group are once again a subset of the topics of FIG. 1, namely topics 1, 6, 8, and 9. The same reasoning applies with the topic category 48 in FIG. 8.

Figure 9:
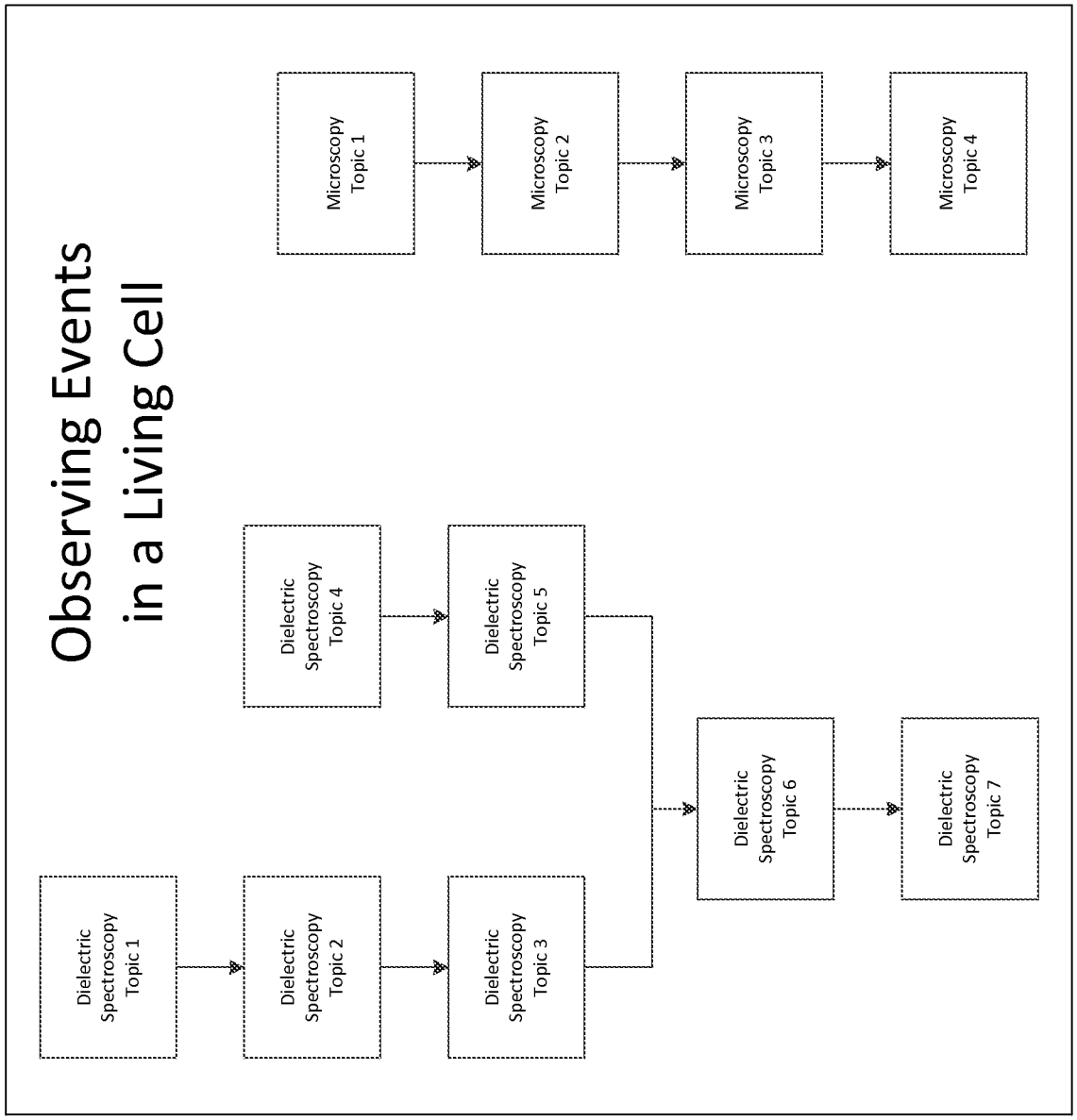
FIG. 9 aids in illustrating various forms of curriculum subdivision.

FIG. 9 aids in illustrating other forms of curriculum subdivision. In this diagram, two groups of topics constitute a topic category titled "Observing Events in a Living Cell." The first group concerns utilizing dielectric spectroscopy, an analytical lab tool, to observe changes in the cells of a biological sample. The second group covers analysis of the same cells with microscopy, instead of dielectric spectroscopy. A practitioner interested in the similarities, differences, and synergies between the two analytical approaches may be presented with a topic category containing both groups of topics. In another scenario, a topic category presented to a learner who is only interested in dielectric spectroscopy will omit the topics in microscopy. In the same manner, the topics in microscopy may solely constitute a topic category on that subject.

Figure 10:
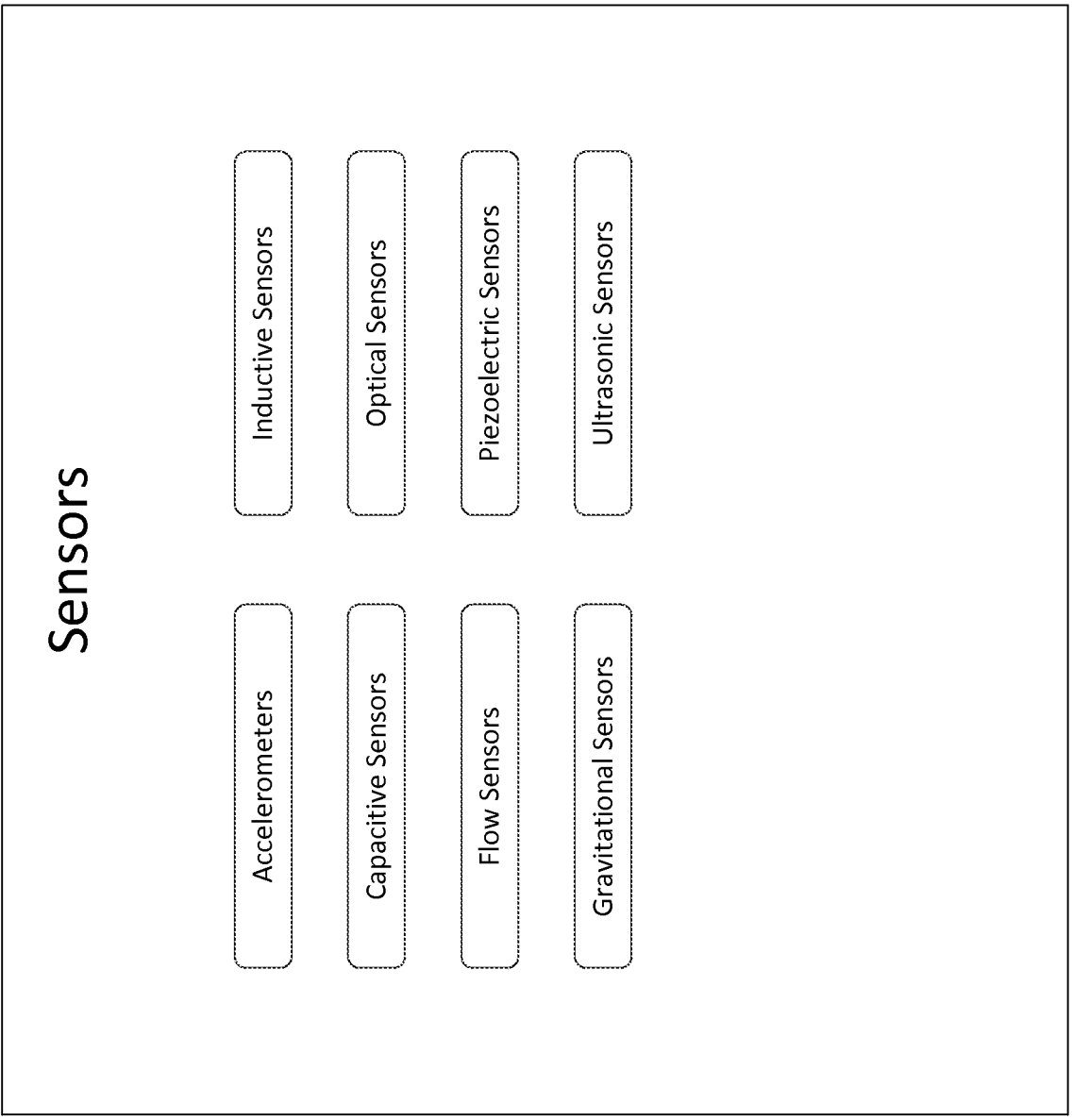
FIG. 10 is an example of topic categories that are classified under another topic category.

FIG. 10 is an additional example of topic categories within another topic category. Here, the parent topic category is titled "Sensors" and appears in FIG. 3 among other higher-level topic categories. FIG. 10 lists specific categories of sensors, enabling a user to more finely confine the field of search to topics on particular types of sensors.

Figure 11:
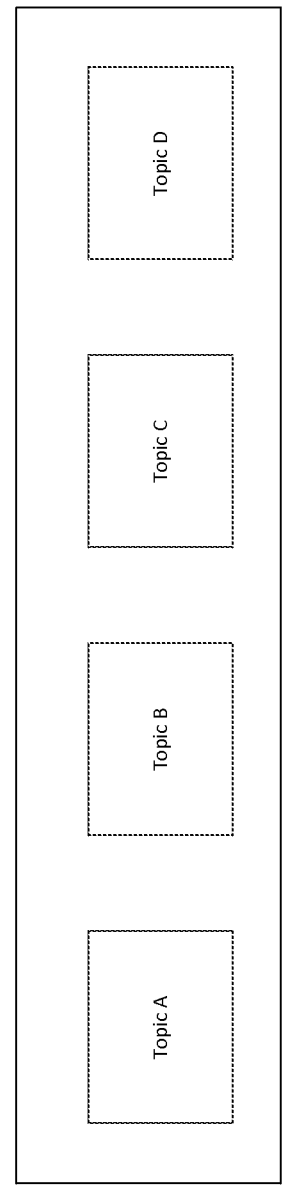
FIG. 11 shows a topic category comprising four topics without sequential relationships.

In a topic category, topics that do not have an indicated sequential relationship may be comprehensibly accessed in any order. In the figures, sequential relationships are vertical and are indicated with arrows. In FIG. 11, topics A through D, which constitute a topic category, are not sequentially related. Therefore, any of these topics may be accessed first or last since none is a prerequisite for understanding the others. Examples of the order in which a learner may access these topics are A-B-C-D, B-D-C-A, and D-C-A-B. Similarly, in FIG. 1, topics 2, 6, and 9 lack a sequential relationship. They may be accessed in any order: 2-6-9, 2-9-6, and 9-2-6 are examples of logical orders of access. Topics 4 and 5 in FIG. 1 are additional examples of topics that are not sequentially related to each other.

In FIG. 9, the three topics designated "Dielectric Spectroscopy Topic 1," "Dielectric Spectroscopy Topic 4," and "Microscopy Topic 1" may be accessed in any order. Each of these three topics is the first topic in a branch of topics. Typically, a user or an algorithm that selects topics for the user to access will completely traverse one branch before proceeding to another branch. An exemplary logical order of access for the topics in FIG. 9 is to start with the topic designated "Dielectric Spectroscopy Topic 1" and proceed in ascending order to the topic titled "Dielectric Spectroscopy 7." Afterward, the topic titled "Microscopy Topic 1" may be accessed and then followed by the second, third, and fourth topics in microscopy, as titled in FIG. 9. An alternate logical order of access is: topics one through four in microscopy, topics four and five in dielectric spectroscopy, topics one to three in dielectric spectroscopy, and then topics six and seven in dielectric spectroscopy.

Benefits of Inter-Topic Structure

As described above, elements of inter-topic structure are granularity, an application-driven approach, a relevance-driven-approach, and learner-centric topic categories. These elements enable learners to quickly and efficiently navigate a curriculum to locate topics of interest. A granular topic structure permits learners to finely distinguish between topics that are relevant to their interests and those that are not. They are thus able to avoid time-consuming distractions with non-relevant subjects. When the topic structure is application-driven, it examines principles of a discipline in terms of real-world usage, thereby allowing learners and practitioners to locate those topics that address the practical objectives that matter to them. A relevance-driven topic structure ensures that a learner is able to locate a suitable point of entry for studying a subject, where that point of entry is neither too advanced to preclude adequate comprehension nor too basic so as to make the process unnecessarily time-consuming.

Absent of effective means for navigating a curriculum, a common method for locating information is to perform searches, such as on the internet with a search engine. However, the results provided by a search engine or most other search methods tend to appear in random order. That is, pages or documents describing more advanced topics will frequently appear before those with elementary information. Additionally, large amounts of non-relevant information will be encountered in this search process. Left to the user is the highly time-consuming task of filtering and organizing the search results into an order of precedence suitable for learning. For the purpose of maximizing productivity, it is therefore beneficial to employ effective means for locating pertinent information, as provided by elements of the inter-topic structure.

Intra-Topic Structure

Where the above inter-topic structure provides a regular framework for organizing and locating topics in relation to other topics, the intra-topic structure organizes the presentation of each topic around an internal framework. This framework particularly addresses the problem of incompleteness by ensuring that the delivery of every topic in the curriculum comprises certain elements. It also enables rapid coverage of each topic, a result achieved by simplifying the content delivery process. This simplicity arises largely from the uniformity imposed by the framework on the manner in which topics are presented to the audience.

In some embodiments of the invention, the intra-topic structure has six elements: the topic page, concept section, express project procurement tools, costs section, time section, and intra-topic navigation tools. Here is a brief description of these elements, followed below by a more detailed examination. A topic page organizes and presents all the other elements of the intra-topic structure; the concept section of a topic page explicates the major principles of the given topic and normally employs a hands-on project to achieve this objective; the express project-procurement tools are means for quickly acquiring equipment and supplies (project resources) to be utilized in the project; the costs section provides examples of and thus insights into the costs involved in practicing or implementing the concepts presented; the time section gives examples of the time commitment required to implement the presented principles in real-world applications; and the intra-topic navigation tools provide immediate access to any of the discrete sections of a topic page, from any location on the page.

Topic Page

Figure 2:
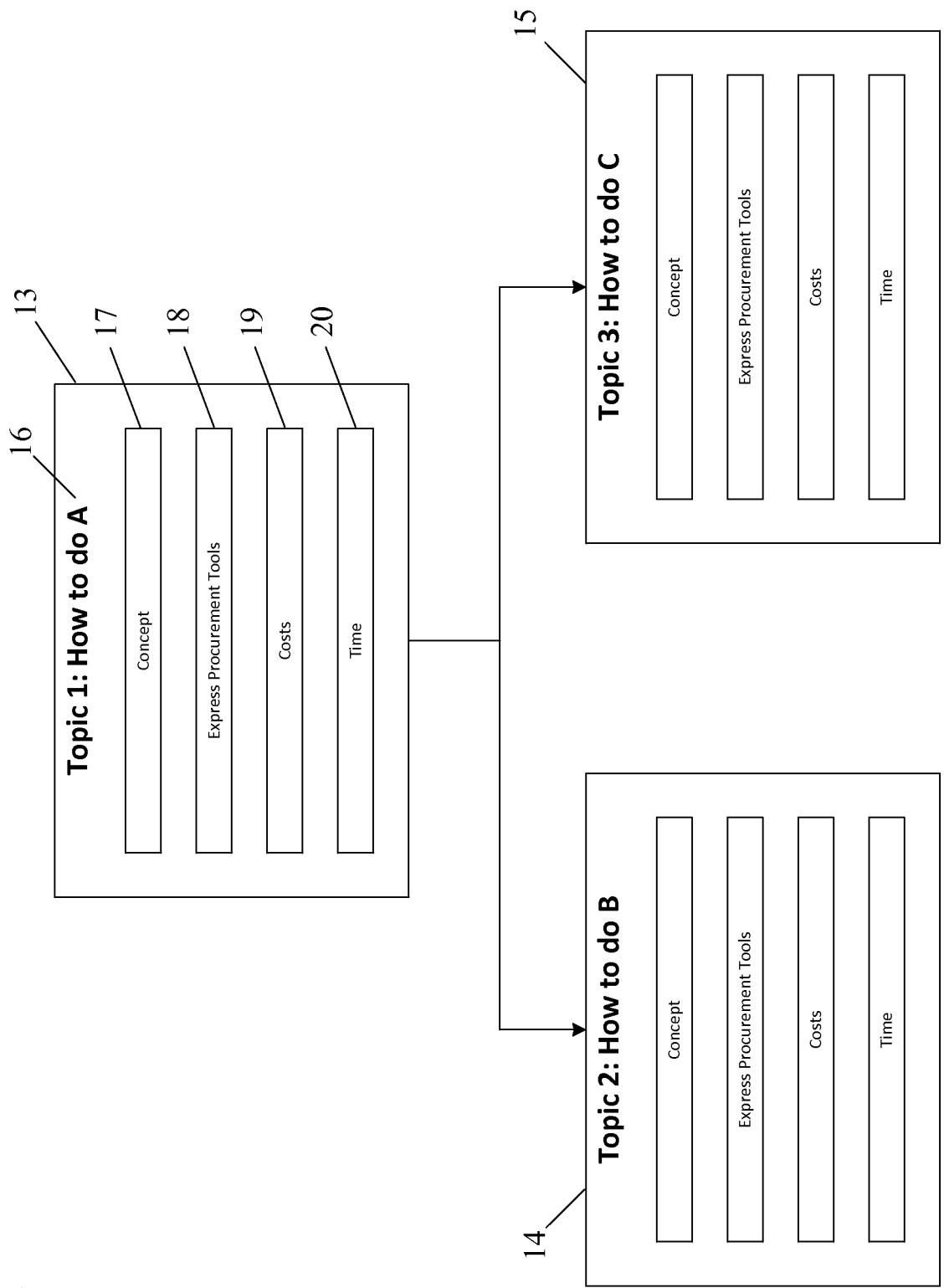
FIG. 2 aids in summarizing the principles that underlie both inter-topic and intra-topic structure.

Ordinarily, the topic page is a web page, graphical user-interface, or similar view devoted to educating an audience on a particular topic. In various embodiments of the invention, each granular topic in a curriculum or discipline is assigned a topic page. A topic page organizes and presents the other elements of the intra-topic structure, namely the concept section, the costs section, the time section, the express project procurement tools, and the intra-topic navigation tools. FIG. 2 is a symbolic diagram of three topic pages 13-15. The title of the first topic page is labeled 16. FIG. 2 is similar to FIG. 1 except that in FIG. 1, only titles appear for each topic. In FIG. 2, other elements of the intra-topic structure (except navigation tools) are referenced as follows: topic page 13, concept section 17, express project procurement tools 18, costs section 19, and time section 20.

Concept Section

Ordinarily, the concept section of a topic page concisely presents to the audience one main idea for mastery. A slideshow format, which may embed audio and video, is an exemplary embodiment of the concept section. A video format is an alternative embodiment of the concept section. This slideshow or video (multimedia presentation) is an application-driven lesson that explicates principles, typically with the aid of a project. The project demonstrates experimental hardware, physical experiments, hardware design, or other activity involving manipulation of physical entities. In this regard, the presentation guides the audience through one or more real-world problems or objectives that teach the foregoing principles. All the project resources necessary to execute the project are made readily available to users for purchase, rental, reservation, or acquisition by other means.

The multimedia presentation may proceed in a stepwise manner, thereby permitting the audience to understand a unit of knowledge or perform a step on the associated project before advancing to the next part of the presentation. This stepwise, project-based approach provides an immersive learning experience. Detail-rich, this experience bypasses confusion that arises from an abstract style of teaching where examples are lacking. By disseminating knowledge through an immersive approach, the problem of incompleteness described earlier becomes insignificant. Projects enable learners to experience phenomena firsthand and form their own independent conclusions. Where a picture is worth a thousand words in communication, a project is worth many billion.

Express Project-Procurement Tools ("Procurement Tools")

A project that involves manipulation of experimental hardware is normally integrated into each lesson. The project serves to demonstrate the practical nature of the topic, to quickly and effectively convey the important lessons through hands-on learning, and to engage the audience with interesting applications. Furthermore, the project contributes toward addressing the incompleteness problem by enabling learners to obtain as much first-hand experience with the subject matter as necessary. Projects advance the applied approach of the invention to knowledge dissemination.

The aim of the express project-procurement tools is to shorten as much as possible the time required to gain applied knowledge of STEM topics. To achieve this objective, the procurement tools eliminate complexity from the process of acquiring correct experimental hardware. This highly simplified process enables users to quickly purchase, rent, reserve, or otherwise acquire project hardware demonstrated in the concept section. Each set of project resources acquired with the project tools is complete, requiring no additional parts and requiring no further instruction on its method of operation beyond what is provided in the multimedia presentation. Consequently, it is not necessary for users to embark on the time-consuming and error-prone activities of searching catalogs for parts, purchasing the parts from multiple vendors, and then seeking clarification on their operation. Furthermore, projects covered in the presentations are pre-built and do not require additional assembly beyond what is directly relevant to practicing the topic. With ready-to-use project hardware that may be acquired at the click of a button, practitioners can focus on learning and avoid distracting chores.

Tools for acquiring project resources may appear on the same page or screen on which the multimedia presentation describing the project appears or is referenced, permitting users to quickly and conveniently procure project resources relevant to topics of interest. An exemplary project procurement tool is a one-click ordering or rental process that can be initiated from the page or screen where the corresponding multimedia presentation appears. Time-efficient methods for delivering the project resources to users are arranged.

The first topic 1 in FIG. 1 can serve to illustrate how projects aid effective transfer of knowledge. A project device may be designed for teaching this topic. The device comprises the three types of amplifiers explored in the multimedia presentation for topic 1. This device is additionally equipped with auxiliary components and various controls that allow users to experiment with the operation of these amplifiers, thereby providing users with insight into and immediate feedback on the functioning of the amplifiers. For the DC amplifier, an optical sensor may serve as input to the amplifier and would be an included component of the project device. A user may vary the level of light to which this sensor is exposed in order to see an output response on a display. For the AC amplifier, the user may connect an audio source such as a microphone to hear the output on a speaker. The RF amplifier may be employed in demonstrating an RF repeater, which boosts and re-transmits a weak radio signal. All the necessary hardware for deploying the RF repeater are included in the project device.

Additional projects that are not covered in the concept section of a topic page may also be made available for procurement. In contrast to the pre-built projects explored in the presentations, these projects are generally not pre-assembled and are instead customizable by practitioners as desired. Customizable projects provide users an opportunity for additional practice, the benefit of which is a deeper understanding of the topic. As these projects have been pre-tested and validated, they may also serve as building blocks in more advanced projects. Used as building blocks, customizable projects eliminate days, weeks, and even months of time-consuming work aimed at perfecting a subsystem, thereby allowing practitioners to focus on their overall creative goals.

Customizable projects may be provided by members of an open source community that is associated with a website or similar portal where an embodiment of the invention is deployed. The customizable-project tool (CPT) enables contributors to provide a list of parts and supplies for implementing the projects they contribute. Parts may be referenced by widely recognized identifiers such as manufacturer part number. From the list of parts, the CPT automatically calculates the total project price and shipping speed from various vendors, permitting cost and shipping speed comparisons by end-users. Importantly, the CPT enables end-users to quickly order complete sets of project resources, thus bypassing the time-consuming and error-prone process of locating and purchasing the individual parts and supplies.

As part of a project submission, contributors of customizable projects may also provide assorted files such as videos, photographs, schematics, and computer code that enable comprehension and implementation of the project. The CPT functionality may be accessed through the additional projects button 27 in FIG. 4. Altogether, the CPT accelerates the knowledge and skill transfer process by sharply reducing the time required to practice knowledge and gain real-world experience.

Costs Section

Economics is critical to scientific and technological endeavors, though it is not readily acknowledged or addressed in detail in traditional scientific and technology media. If the learning process is to become problem-solving oriented, then detailed knowledge of implementation costs is requisite. Costs will permit or prohibit a technical endeavor. Therefore, readily available information on costs is highly valuable. The absence of cost information from knowledge sources poses an impediment to innovation, as it must then be painstakingly sought out by the practitioner. Opportunities for innovation are difficult to accurately envision without knowledge of the cost obstacles present or absent. For example, efforts to develop a new kind of chemical sensor for point-of-care diagnosis will consider the R&D budget likely to be required. This budget takes into account factors like cost of chemical reagents for assays, cost of access to research facilities, cost of parts for developing the new instrumentation, cost of design software, cost of prototyping products and services, and so on. These costs will also bear on the final product and thus will play a key role in determining the size of the demographic that can afford the product. In turn, this market-size will determine the viability of the product in the marketplace. For the practicing scientist, technologist, and innovator, knowledge of costs is critical for effective problem solving.

The costs section therefore aims to provide current and continuously updated cost information for various technologies, processes, and legal obligations that are relevant to practicing the principles addressed in the presentation. Some examples of important cost categories are: cost of parts related to implementing the concept, cost of equipment, maintenance costs, cost of consumables, software costs, energy costs, facility costs, taxes and government fees, and costs of implementing alternative or related concepts.

Time Section

In the time section, the duration of processes with regard to the finite resource of time is of concern. The methods that constitute various embodiments of the invention are aimed at efficient transfer of knowledge and skills for real-world problem solving. In real-world applications, the issue of time becomes critical. It is no longer sufficient to be simply introduced to an interesting concept. That concept may prove impractical when time considerations come into play. For example, the value of two chemical-reaction mechanisms to an onsite analytical procedure becomes clearer when it is known that one chemical reaction requires three hours to complete satisfactorily, whereas the alternative completes in 15 seconds. While the three-hour reaction has an appreciably lower cost, the 15-second reaction has superior value in this particular case because it can produce almost immediate results.

The time element is very important for planning in a variety of situations. Exemplary scenarios are new business model development, planning research within academic or industry time constraints, process redesign for greater efficiency or higher throughput, and estimating labor costs for a new process. The time section provides a sense of the time commitment required to execute processes related to the topic. Very importantly, understanding the time requirements of existing processes can inspire time-saving innovations.

Relevant time categories that may be covered in the time section include: estimated time to master the current topic, time required to perform technical procedures related to the topic, duration of various natural and artificial processes related to the topic, time to acquire supplies (stocked inventory, custom order, overseas order, etc.), and estimated times to carry out legal requirements necessary for practicing the topic (ex. obtain permits, obtain certifications or license, receive clearance, etc.).

By providing a strong sense of the time scales involved in practicing the topic, the time section enables innovators and problem solvers to explore and devise new methods that achieve desired time objectives. Importantly, the time section strongly contributes towards addressing the problem of incompleteness by making available to creators essential information that would normally require additional time-consuming research to uncover.

Intra-Topic Navigation Tools

Figure 4:
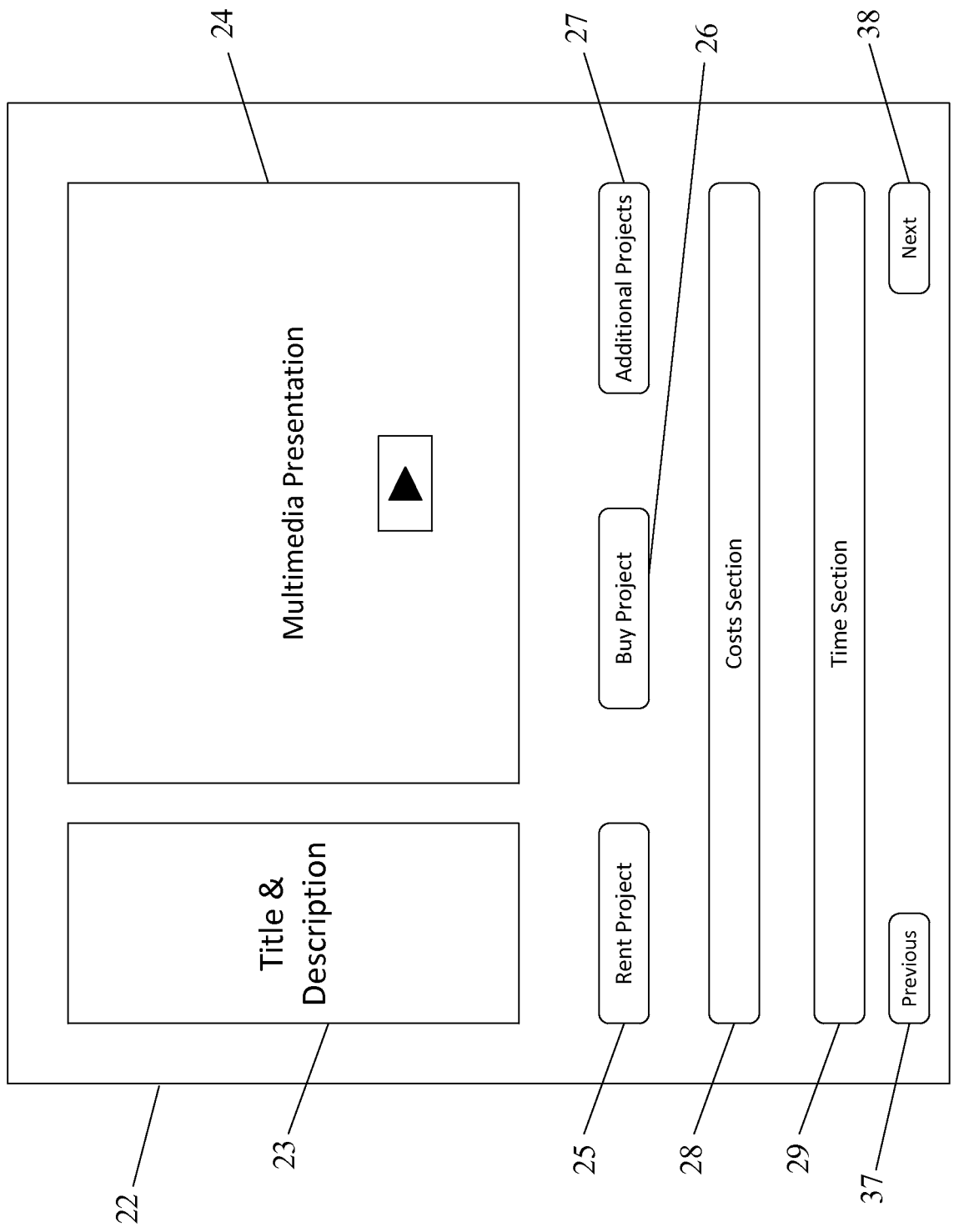
FIG. 4 is a schematic model of a topic page and aids in describing intra-topic structure.

Intra-topic navigation tools serve the function of providing immediate access to a section of a topic page when the user is currently accessing any other section. In this capacity, the navigation tools obviate time-consuming search for common points of interest in the process of exploring a topic. In some embodiments of the invention, discrete elements of the topic page that are accessible via the navigation tools include the concept section, costs section, time section, and procurement tools. FIG. 4 models an embodiment of a topic page 22 that has intra-topic navigation tools 25-29. This topic page is a web page and comprises a title and description 23, the multimedia presentation 24, project tools 25-27, an interactive tab 28 that displays the costs section upon activation by a user, and an interactive tab 29 that displays the time section when invoked by a user.

The procurement tools and section tabs 25-29 are the navigation tools of note on the topic page of FIG. 4. In one embodiment, the project tools are click-responsive buttons. For example, when a user is signed into his or her account on the website, clicking the, "Buy Project" button 26 places an order for project resources of the pre-built project associated with the current topic page. Alternatively, the "Buy Project" button 26 may add project resources for the current project to a virtual shopping cart. With this arrangement, the user may add a variety of projects resources from different topic pages to the shopping cart before placing an order.

In various embodiments of the invention, each topic page or screen is uniformly designed, whereby the formatting and other aesthetics of one topic page is substantially identical to those of other topic pages. This consistency enables ease of access because in each lesson, users interact with an interface that is already familiar. The methods of accessing the discrete elements of a topic page are uniform from one topic page to the next. The aim and effect of uniformity is to substantially reduce complexity, thus minimizing the time required to access, learn, and implement the various principles of a discipline.

Summary of Inter-Topic and Intra-Topic Structure

This new paradigm comprising an inter-topic and intra-topic structure places strong emphasis on deep experiential learning and eliminates many time-consuming, non-value adding activities in the learning process. FIG. 2 summarizes these structures. Benefitting from the regularity of this framework, learners can focus on subject objectives, rather than on the minutiae of locating information or procuring paraphernalia.

Extended Example of the Framework in Organic Chemistry A description of an embodiment of the invention in the discipline of organic chemistry is as follows. First is an overview of the appearance and function of this embodiment, which takes the form of a website that is accessible via a computer device. Secondly, it is shown how the appearance and function of this website stem from the framework of inter-topic and intra-topic structure.

Overview of Appearance and Function Deployed on a website is a curriculum in organic chemistry. Topics and topic categories from the curriculum may be located and accessed by using a search webpage as modeled in FIG. 12. A user of the curriculum may enter a search phrase such as "make simple organic compounds" into the search box 49. Clicking the search button 50 executes the search and displays a result webpage that is illustrated in FIG. 13. Four results appear in FIG. 13 for the given search phrase above. One of these results is labeled 51. Each result represents a topic category comprising one or more topics. Clicking on a result displays the topic page for the first topic in this topic category. FIG. 4 provides a basic model of a topic page. When the topic category of a selected result comprises more than one topic, a "next" button 38 appears for navigating to the ensuing topic. Similarly, the "previous" button 37 appears as applicable to enable a user to navigate back to topic pages that were visited earlier. When using the next and previous buttons with a topic category that has multiple branches, the algorithm for determining the sequence in which to present topics to the user is any reasonable logical order of access, as was described in the section on topic categories.

A user may save a result that appears on the result page by adding it to a queue associated with the user's personal account on the website. Saved results may be accessed at a later time when the user logs into his or her account. Clicking the "Q" button associated with a result will add that result to the queue. One such "Q" button is labeled 53 in FIG. 13. Upon clicking the Q button, the user is prompted to login to his or her account if the user has not previously done so.

Results that are added to the queue may be accessed by clicking the "Go to Queue" button 52, which displays a queue webpage. An illustration of a queue webpage appears in FIG. 14. In this diagram, two results from the results page have been saved to the queue. One of these results is labeled 56. The topic page(s) of a result saved to the queue can be accessed in the same manner as from the results page. Of note also is a delete (x) button associated with each result, one of which is labeled 58. A user may remove an entry in the queue by clicking its associated delete button.

Figure 5:
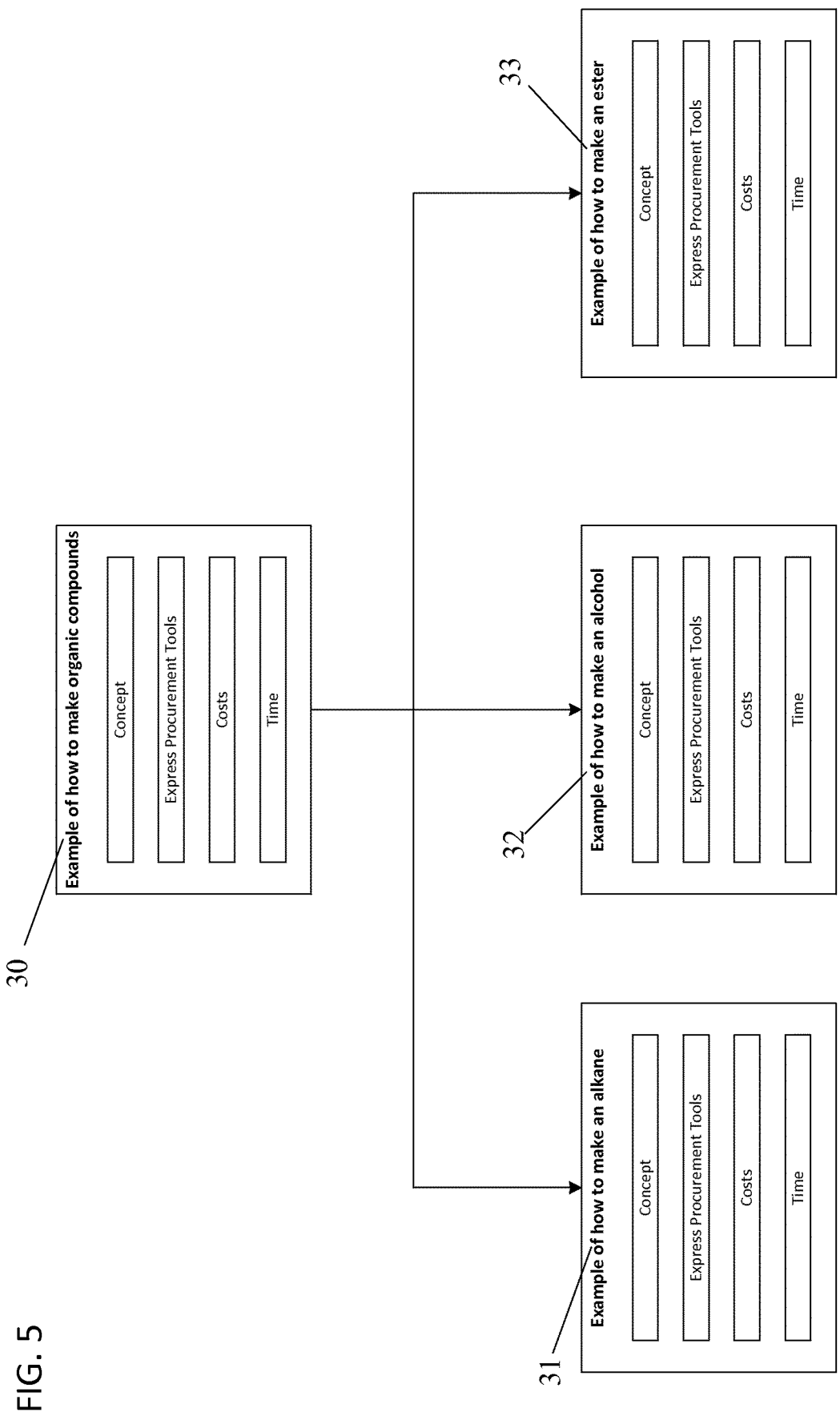
FIG. 5 depicts inter-topic and intra-topic structure for a set of lessons in organic chemistry.

Derivation of Appearance and Function from Inter-Topic and Intra-Topic Structure FIG. 5 will aid in describing how the appearance and function of this embodiment of the invention arises from the framework of inter-topic and intra-topic structure. This figure is a conceptual illustration of the underlying framework of this embodiment, as opposed to a webpage or other visual that is presented to users of the curriculum. The topic category in FIG. 5 is one of many topic categories in a hypothetical organic chemistry curriculum. This particular topic category is of interest because it most closely matches the search phrase entered on the search webpage by a user, as described above. This search phrase was "make simple organic compounds." Corresponding to the search phrase, the subject of FIG. 5 is organic chemical synthesis. The results that appear in the result webpage of FIG. 13 have their basis in the topic category of FIG. 5.

The topics 30-33 in FIG. 5 are executed with the inter-topic structure described previously and reviewed here as follows.

Granularity in this Embodiment

Topics 30-33 are each constructed with sufficient granularity so as not to overwhelm the audience with information. Each topic focuses on one essential concept that can be absorbed in a short period of time, where this period is well within the typical attention span of the target audience. In this regard, the multimedia presentation that addresses the first topic 30 refrains from arduously covering many principles of organic synthesis, but instead provides one example of organic compound preparation. Subsequent topics will explore additional granular concepts so that all the topics, in aggregate, explicate the subject of organic synthesis in greater depth.

Application-Driven Approach in this Embodiment

The topic structure of FIG. 5 is application-driven in that all its constituent topics examine how to achieve an objective or solve a problem. The objective of the first topic 30 is to introduce the general subject by guiding learners through a process of synthesizing a selected organic chemical. The multimedia presentation demonstrates this synthesis process in a manner suitable for step by step emulation by learners. Equipped with correct paraphernalia and reagents, learners are able to follow along with the presentation. Subsequent topics 31-33 examine in more detail how to synthesize particular classes of chemicals (alkanes, alcohols, and esters); and as with the first topic, their corresponding multimedia presentations also teach by example.

Relevance-Driven Approach in this Embodiment

The topic structure of FIG. 5 is also relevance-driven. Precedence order is clearly communicated: the first topic 30, a general introduction, is a prerequisite to three subsequent topics 31-33. The introduction prefaces and gives relevance to the ensuing topics: by engaging a learner's interest in organic synthesis at this stage, he or she may develop a curiosity that drives further study of the subject.

Learner-Centric Topic Categories in this Embodiment

Topic categories enable a user of a curriculum to locate points of interest in the curriculum. In the examples provided above, the user seeks to locate in an organic chemistry curriculum some topics that teach synthesis. The user conducts a search with the search phrase "make simple organic compounds." Based on the search phrase used, an algorithm generates a list of results that most likely match the user's interests and level of knowledge in the subject. Exemplary search results appear in a result webpage shown in FIG. 13. The first search result 51 reads "Learn about organic synthesis in a remote lab by making real compounds." This search result represents the topic category in FIG. 5. By clicking on this result, a user may view and interact with the topic page for each topic in FIG. 5, starting with the first topic 30 and sequentially proceeding to topics 31-33.

For the second result in FIG. 13, the search algorithm has determined that the user may only be interested in learning how to synthesize a typical alkane. Hence, this second result represents a topic category with only one topic. This topic is topic 31 in FIG. 5. Similarly, for the third and fourth results, the algorithm provides the user with additional options to choose only those topics that interest him or her. The third and fourth results also represent topic categories that each comprises one topic. These are topics 32 and 33, respectively, in FIG. 5. In essence, the search results present various subdivisions of the topic structure in FIG. 5 according to what the user may potentially find to be of interest.

Intra-Topic Structure in this Embodiment

Figure 15:
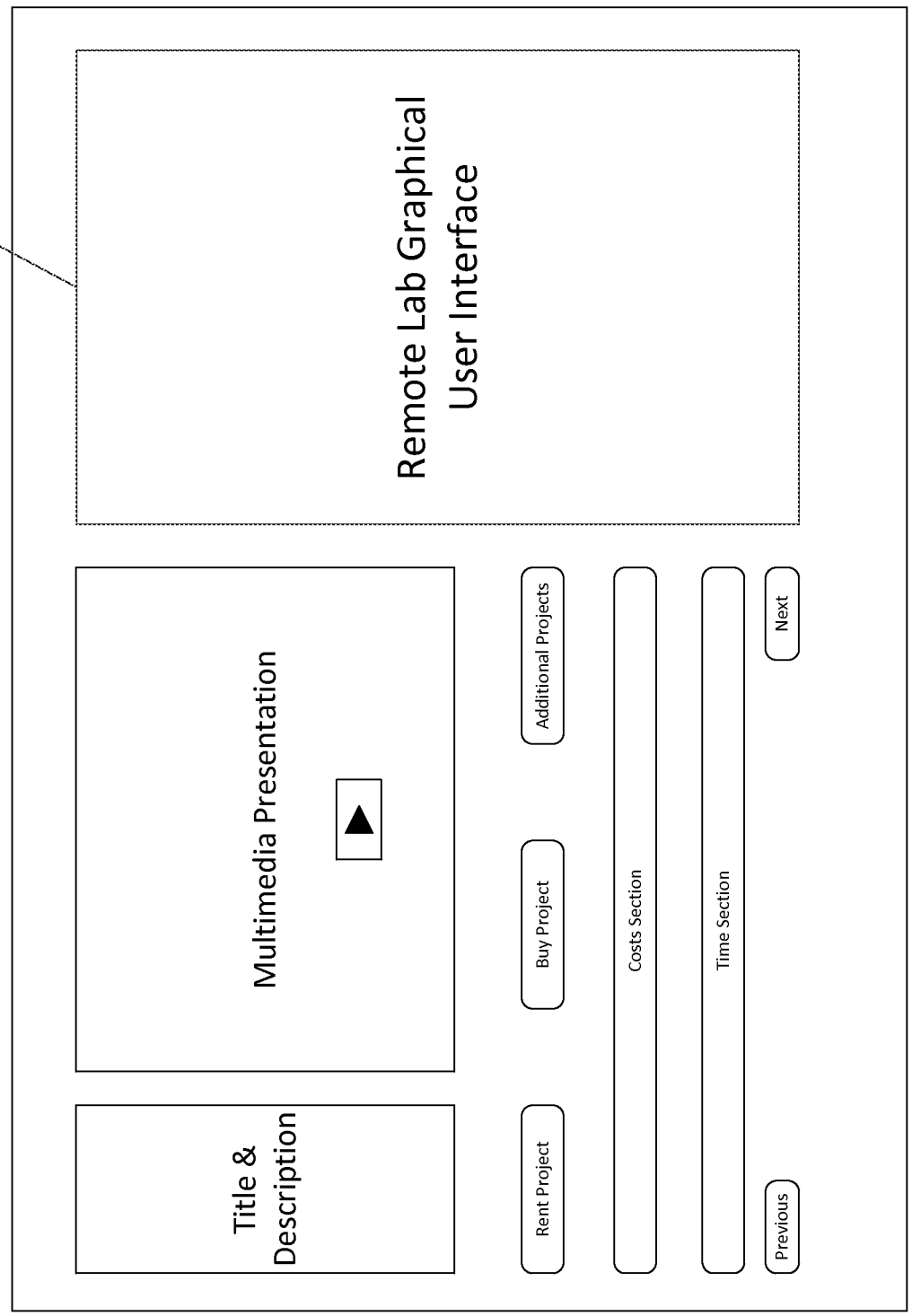
FIG. 15 is a sketch of a topic page that is modified to include a graphical user-interface for interacting with a remote lab.

With regard to intra-topic structure, the nature of the project tools, costs section, and time section are of particular interest here:

For the purpose of cost-effectively equipping learners with modern tools for chemical synthesis, a remote lab is made available for use via the internet. With the remote lab, users are able to perform real chemistry experiments from any location. Such lab is enabled by robotic machinery and/or other automation methods that make remote operations possible. The topic page illustrated in FIG. 4 can be modified to include a graphical user-interface (GUI)—for interacting with the remote lab. FIG. 15 is a sketch of the modified topic page with a GUI 59. Via a computer user-interface, which includes the foregoing GUI, a user of the remote lab may control the various equipment and instrumentation located in the lab. The GUI may also display instrument read-outs and data from experiments in the remote lab. A user may view live-camera feeds from the remote lab in order to monitor the progress of experiments.

Simulation software may be provided for simulating experiments prior to carrying out their physical equivalents in the remote lab. This preview capability enables users to conserve physical resources by avoiding unnecessary trial and error with real equipment and consumables.

By following the directions in the multimedia presentation, a user is able to operate the remote lab and synthesize the compounds covered in each lesson. In the context of chemical synthesis, "pre-built projects" refer to a combination of software programs and the automated lab that they control. These software programs direct automated equipment in the remote lab to demonstrate the synthesis of particular chemicals in specific quantities. Pre-built projects are employed in the multimedia presentations to illustrate principles and methods of chemical synthesis.

Customizable projects, in contrast to the pre-built projects, may be freely modified by practitioners according to their objectives. They may adjust the type and quantity of chemicals synthesized by customizable projects. Practitioners may also reprogram the methods of synthesis. Further, as described previously, customizable projects may be utilized as building blocks in larger projects. For example, compounds prepared by one customizable project may be employed as reactants in another synthesis protocol.

Via the project procurement tools, users may separately purchase lab access and reagents. By paying a monthly subscription fee, users have unlimited access to the remote lab. Reagents and other consumables may be purchased from the topic page that demonstrates an experiment, where the usage fee depends on the quantity of materials used. FIG. 15 is a rendering of a model topic page for this embodiment. On both the search results webpage in FIG. 13 and the queue webpage in FIG. 14, this usage fee appears for each result. One such fee is labeled 54 in FIGS. 13 and 57 in FIG. 14. These fees are calculated based on the quantity of consumables that are specified by the pre-built project(s) associated with each result.

The remote lab offers analytical instrumentation for characterizing chemical substances. Some examples are NMR spectroscopy, IR spectroscopy, UV/VIS spectrophotometry, mass spectrometry, liquid chromatography, gas chromatography, and electron microscopy.

Additionally, the remote lab receives external samples from users for analysis or for use as reagents. Reciprocally, chemicals prepared in the remote lab may be shipped to qualified recipients. The project procurement tools provide access to these features and services. In a topic page for this embodiment, as partly depicted in FIG. 4, the "Buy Project" button 26 is applicable to purchasing lab access and supplies required for exploring pre-built projects. The "Additional Projects" button 27 is applicable to the other services offered by the remote lab, including the customizable projects. Generally, no hardware is rented to users of the remote chemistry lab. Therefore, the "Rent Project" button 25 in the diagram would ordinarily be inapplicable to remote synthesis.

The costs section of a topic page on organic chemical synthesis describes, for example, the economics of obtaining reagents, other consumables, lab ware, and instrumentation that are relevant to performing the procedures in question in real-world applications. Additionally, the costs involved in related industry applications and issues may be described so as to produce insight into the industrial economics and conditions required to implement the concepts examined in the presentation.

In the time section of the topic page, information is made available on the duration of key processes relevant to the particular organic synthesis protocol in question. Examples are time required to perform various chemical syntheses under the most feasible conditions, duration of representative chemical reactions under specified conditions, typical times for equipment and instrumentation setup, time required to prepare samples for a variety assays, and so on.

Extended Example of the Framework in Electrical Engineering

Overview

An exemplary embodiment of the invention in the discipline of electrical engineering is as follows. Sharing some similarities with an online school, a website is designed for the purpose of disseminating curricular knowledge in electrical engineering to the public. Deployed on the website is a collection of multimedia slideshows, which are central to the curriculum. These slideshows are freely and publicly accessible at no cost to viewers. Each slideshow appears on a topic page similar to the one shown in FIG. 4. Each topic page is concerned with a particular topic and is application-driven. The topic pages on the website are categorized by area of application, whereby users of the website may access topics of interest by browsing these categories.

Browsing with a Broad Search Phrase

To view topic categories of the curriculum, a user enters the URL of the website into a web browser. This action displays a search webpage similar to that in FIG. 12. Entering a broad search term such as "electrical engineering" and clicking the search button will display another webpage with a list of broad topic categories. FIG. 3 may be regarded as such a webpage. The listed topic categories on this webpage are hyperlinks. By following a particular hyperlink, a user may loads a webpage that displays the details of that topic category. A user may view the details of the amplifiers topic category, for example, by following the Amplifiers link 21. Regarded as a webpage, FIG. 1 provides this detailed view for the Amplifiers category.

In FIG. 1, each topic title appears within a rectangular outline, or box. With FIG. 1 regarded as a webpage, each of these boxes is an element of a computer user-interface and performs various actions when invoked by a user. The action(s) performed depends on how a user interacts with the box. In one case, clicking within a box with a mouse or its equivalent adds the corresponding topic to a queue. Topics that are added to the queue in this manner are automatically organized into one or more topic categories in the queue. When retrieved from the queue, the topics in each topic category are presented to the user in a logical order of access.

Double-clicking within a box navigates the user's web browser to the corresponding topic page.

Where applicable, clicking a box while pressing a shift key on a keyboard will open a webpage that displays a topic structure. This topic structure shows the selected topic and its precedent topics, if any. For example, performing a shift-click on the box of topic 1 will display the webpage in FIG. 18. In this webpage, topic 1 appears at the bottom of the page and precedent topic categories appear above. The topic category titled "Charge Topics" 68 comprises root topics from which all the other topics in FIG. 18 stem. The shift+click feature thus enables a user to trace the precedents of a topic all the way down to its root topics. With this ability, a user may determine a suitable point of entry for studying a subject, where this point of entry is neither too advanced nor too basic.

Figure 18:
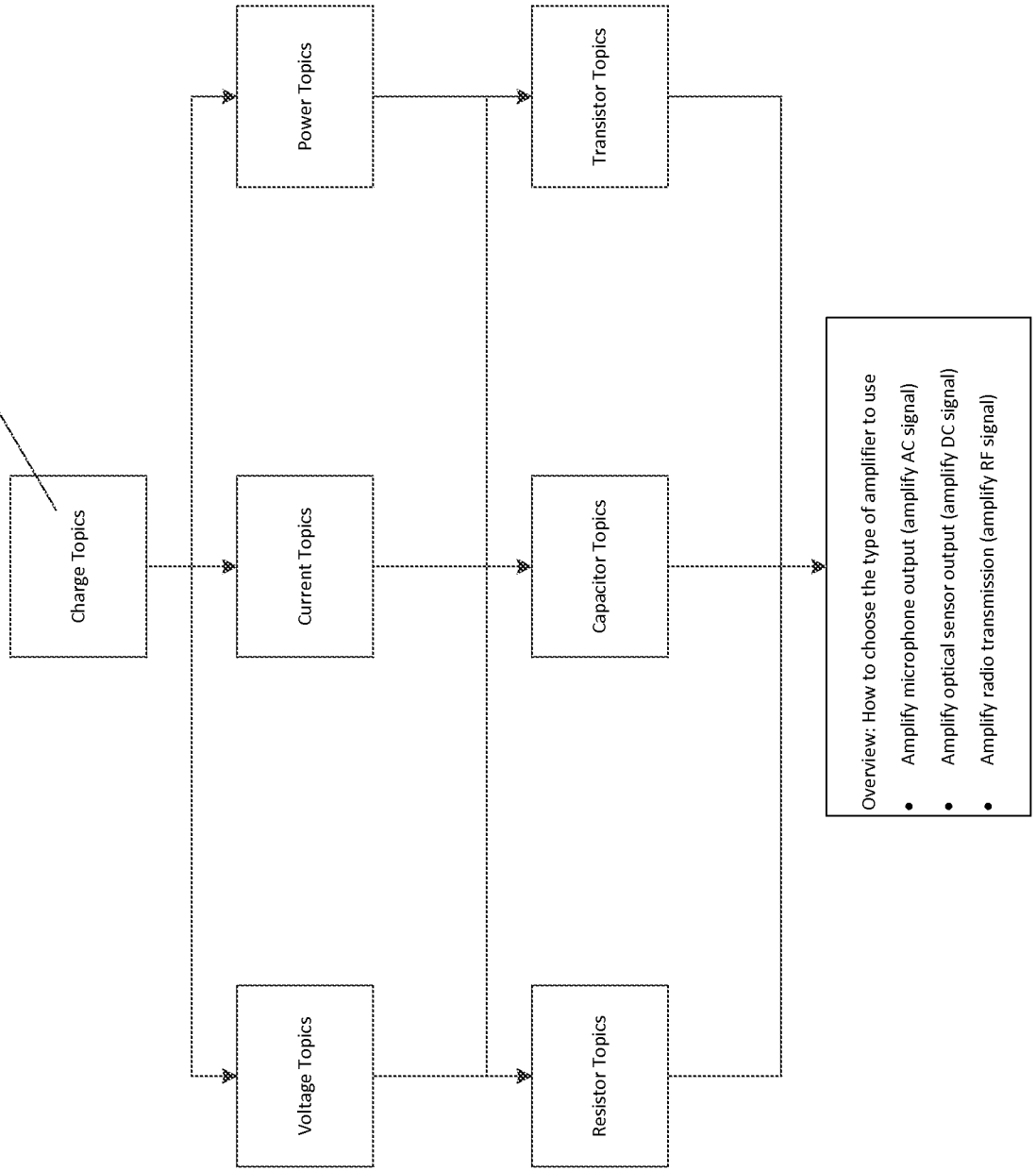
FIG. 18 presents the precedent topic categories for a topic from FIG. 1.

In FIG. 18, clicking on the box of a topic category while pressing a control key on a keyboard will display a topic structure. This topic structure shows the individual topics within the topic category and is similar in form to the one in FIG. 1.

Browsing with a Narrow Search Phrase

Figure 12:
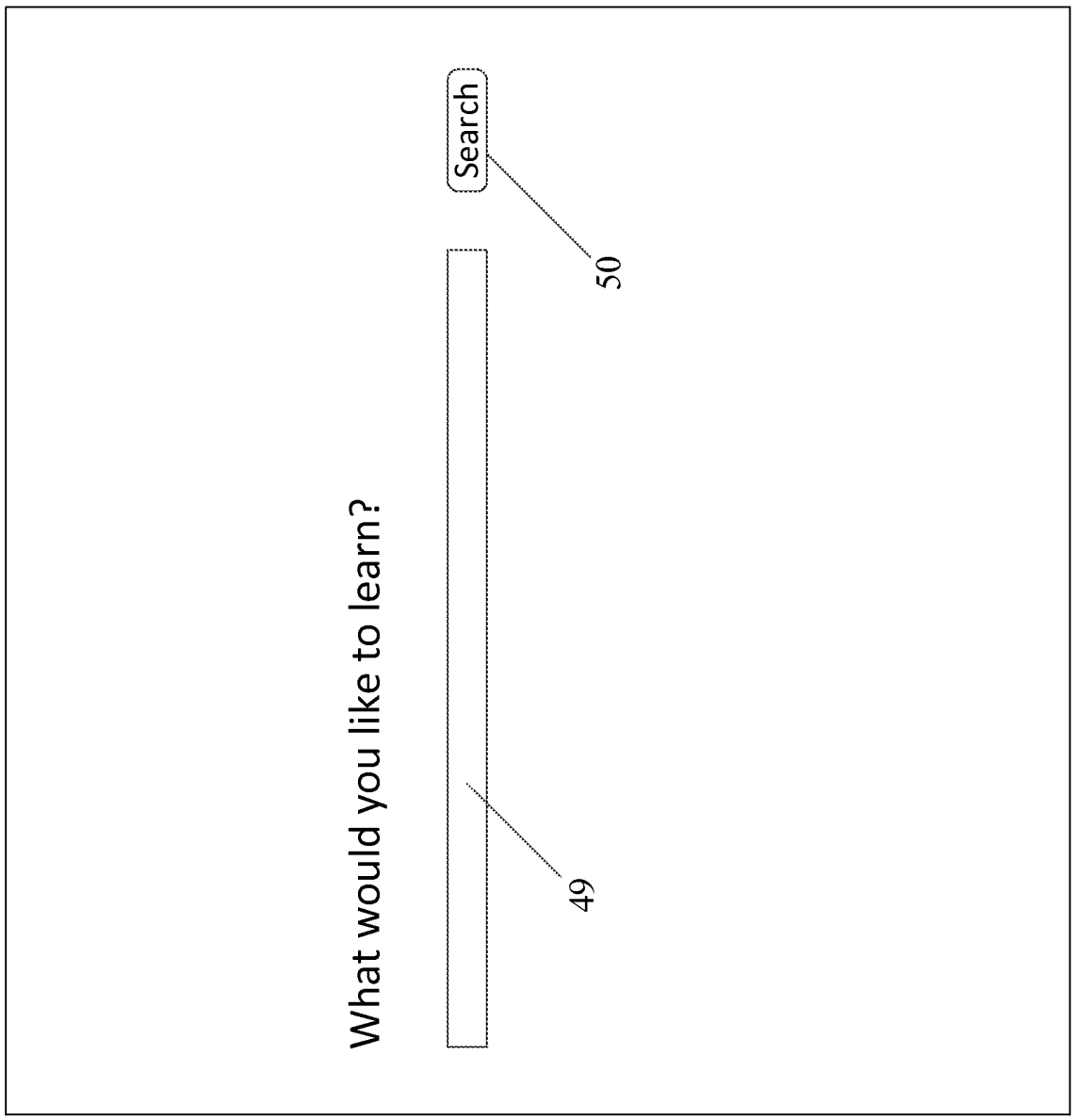
FIG. 12 models a search webpage for locating topics in a curriculum.
Figure 13:
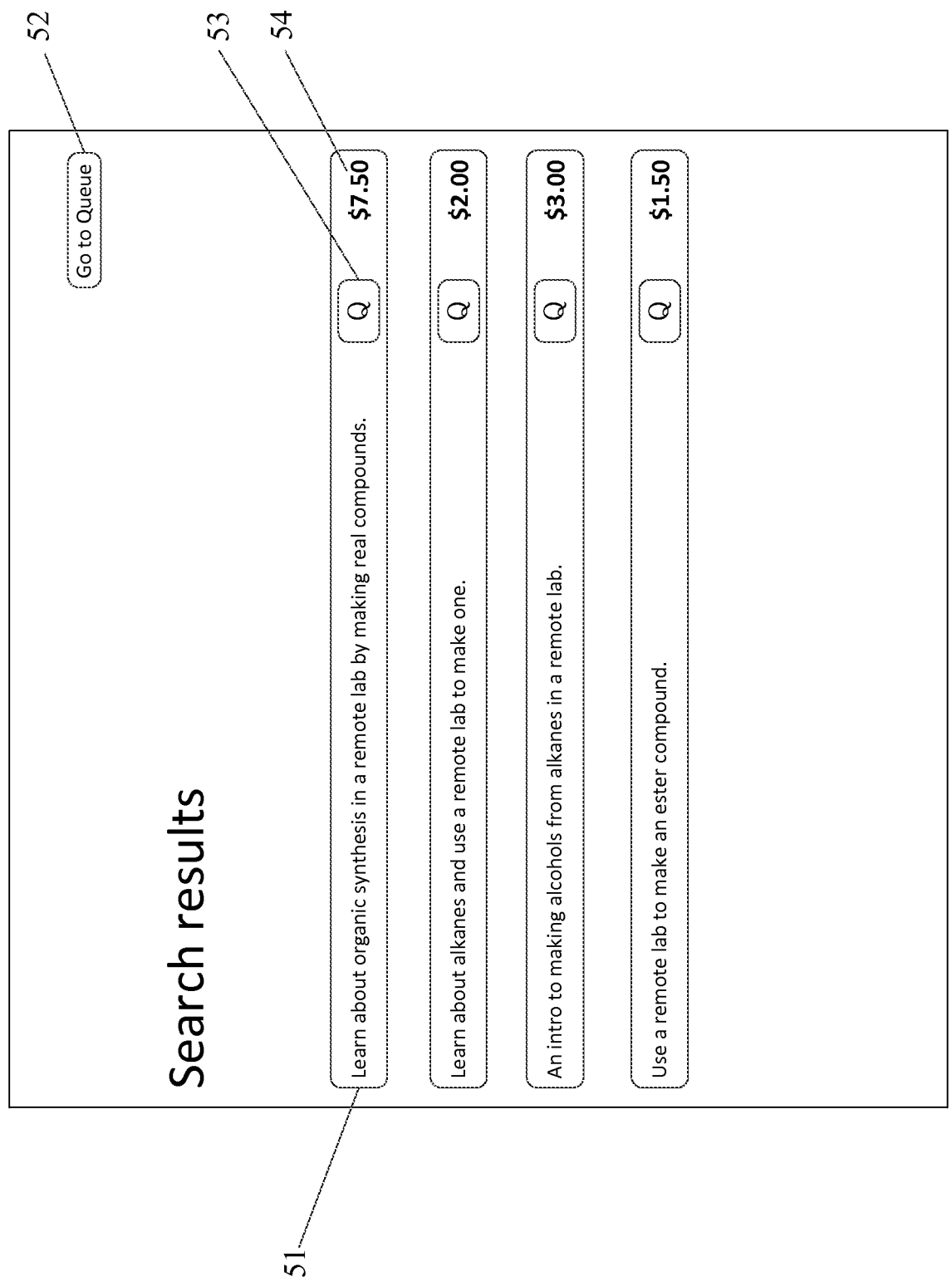
FIG. 13 is a sketch of a webpage that displays search results.

Instead of entering a broad search phrase like "electrical engineering" as was done in the earlier example, a more focused search may be conducted on the search page of FIG. 12. In a new scenario, the search phrase "design amplifier" is used to locate more specific topics. The results of this hypothetical search appear on a webpage illustrated in FIG. 16. This figure presents five search results, each representing a topic category. The first result 60 reads "An introduction to and physical demo of different types of amplifiers." The topic category underlying this result comprises one topic: topic 1 in FIG. 1. Just as with the embodiment of the invention in organic chemistry, clicking on a result displays a topic page. This topic page addresses the first topic in the topic category associated with the search result.

Figure 16:
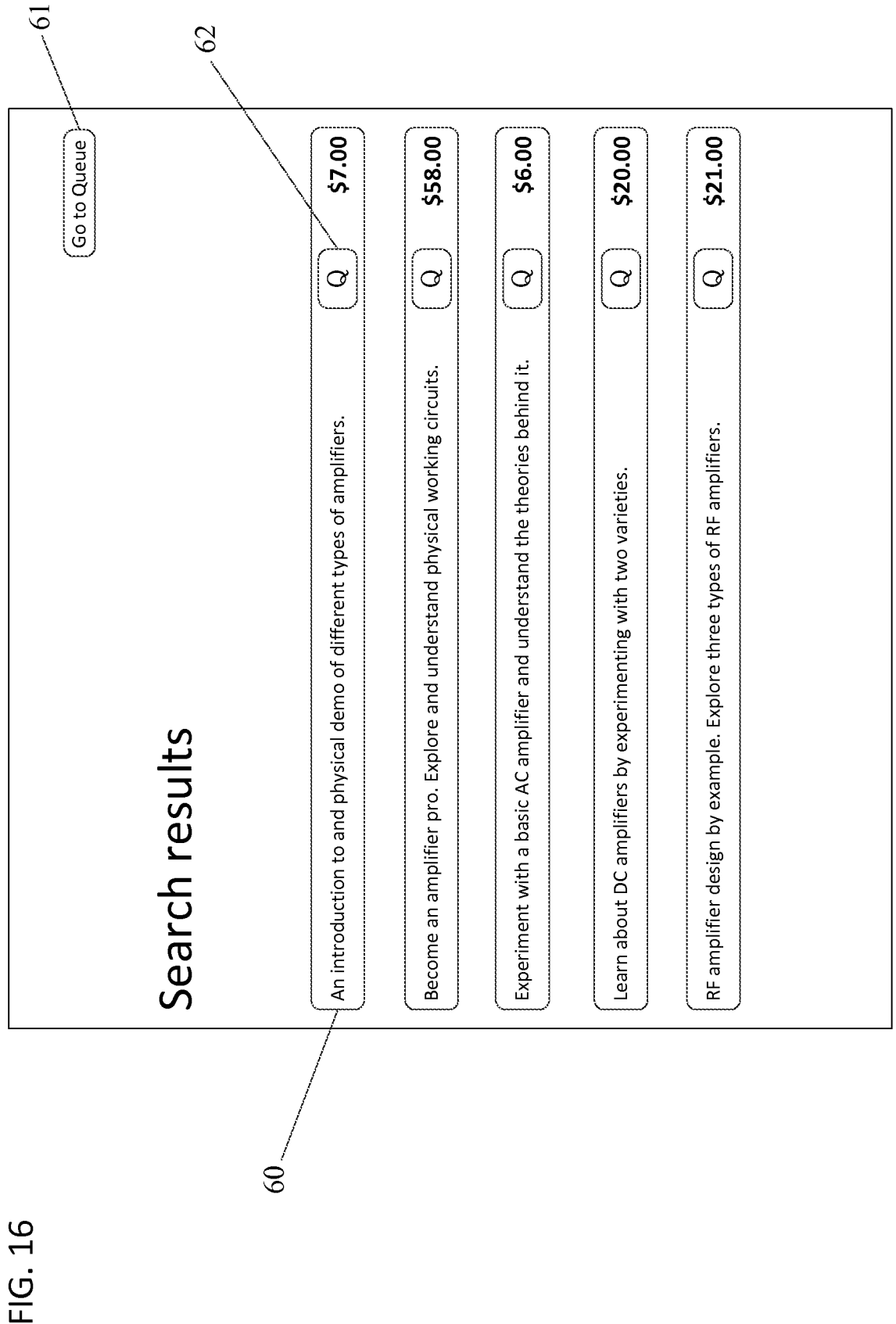
FIG. 16 shows a webpage that displays the results of a hypothetical search.

The second result in FIG. 16 reads "Become an amplifier pro. Explore and understand physical working circuits." This result links to a topic category that comprises the entire topic structure in FIG. 1, for a total of 12 topics. By clicking on this result, a user may view the topic page of topic 1. FIG. 4 depicts a model topic page. Clicking the "Next" button on the topic page of topic 1 advances the web browser to the next topic page in the series, in this case topic 2 in FIG. 1. In this manner, a user may view all topic pages for the topics of FIG. 1 in a logical order of access. One such order of access is: 1-12 in ascending order.

Figure 8:
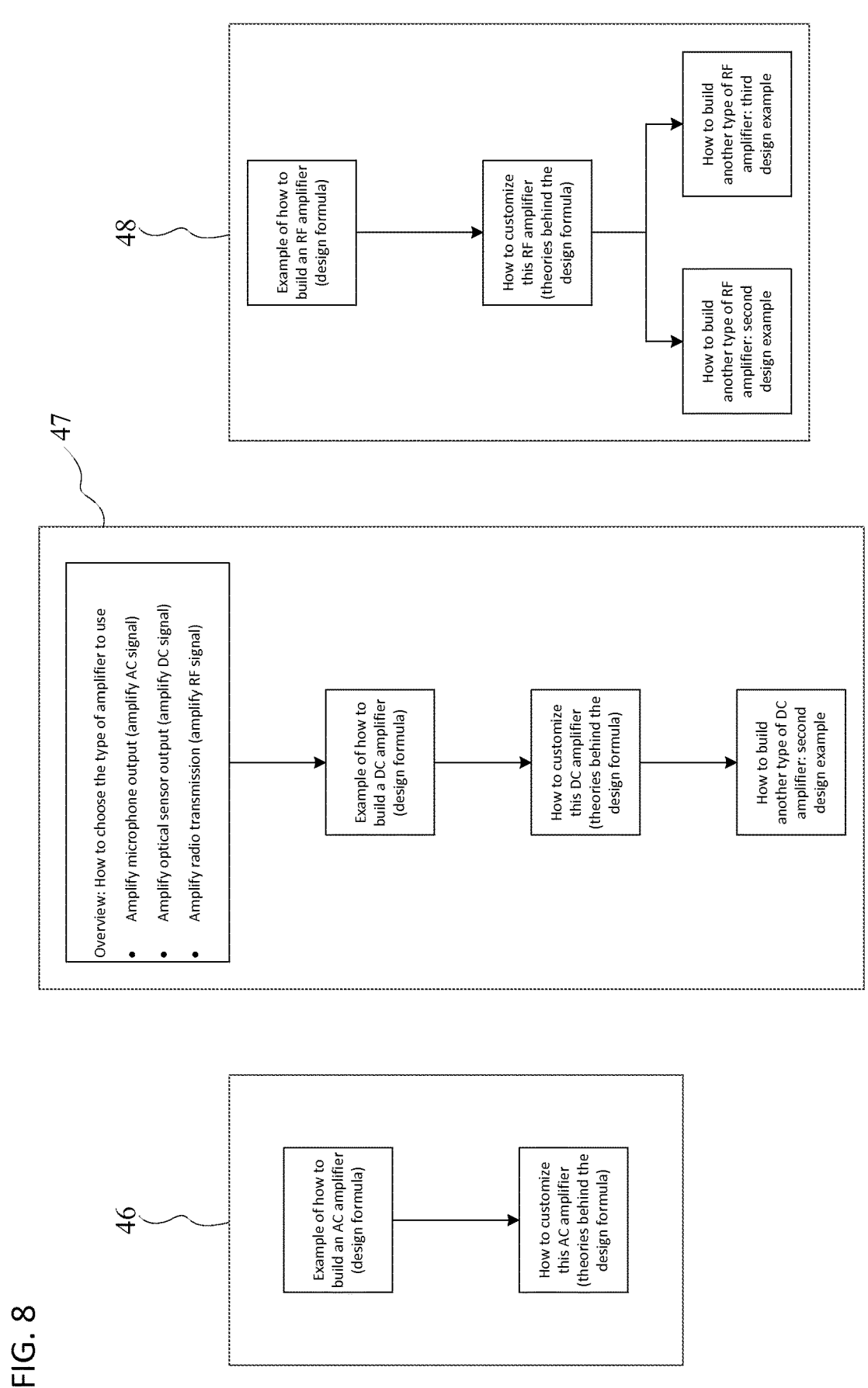
FIG. 8 provides examples of topic categories that are a subset of the topic structure in FIG. 1.

On the result webpage of FIG. 16, the third result links to a topic category 46 in FIG. 8 that is equivalent to topics 2 and 3 in FIG. 1. This topic category is concerned with teaching design principles for a particular type of AC amplifier. The fourth and fifth results in FIG. 16 respectively link to topic categories 47 and 48 in FIG. 8. Both of these topic categories are subsets of the topic structure in FIG. 1, as previously described.

The search results in FIG. 16 reflect the concept of learner-centric topic categories. In producing these results, a search algorithm attempts to provide a range of topic categories, at least one of which will potentially be a strong match with the user's query. In the example of FIG. 16, a search was conducted with the search phrase "design amplifier." The first result is provided with the consideration that the user may simply be interested in a rudimentary overview of amplifiers. Hence, this result links to only one topic: topic 1 in FIG. 1. The second result is based on an assumption that the user may wish to study amplifiers in great depth. Therefore, this result covers all twelve topics in FIG. 1. The other remaining results stem from the consideration that the user may only be interested in specific types of amplifiers.

A user of the curriculum may determine the topic structure for each result in FIG. 16 by clicking on that result while pressing a control key on a keyboard. For example, by holding down a control key and clicking on the fifth result, a webpage loads that displays the topic structure of the topic category 48 in FIG. 8, which examines RF amplifiers. As with the previously elaborated embodiment in organic chemistry, the user may interact with the boxes on this webpage via a computer user-interface. For instance, clicking on a topic box adds the corresponding topic to the queue.

A price appears with each search result in FIG. 16. This price is the sum of the cost of all the project resources required to learn the topics of a given result. As an example, the second result links to a topic category with a dozen topics. One set of project resources is associated with each of these topics. The price of each set is approximately $5.00; and the total price for all twelve sets is $58.00, as shown.

Queue in this Embodiment

Figure 14:
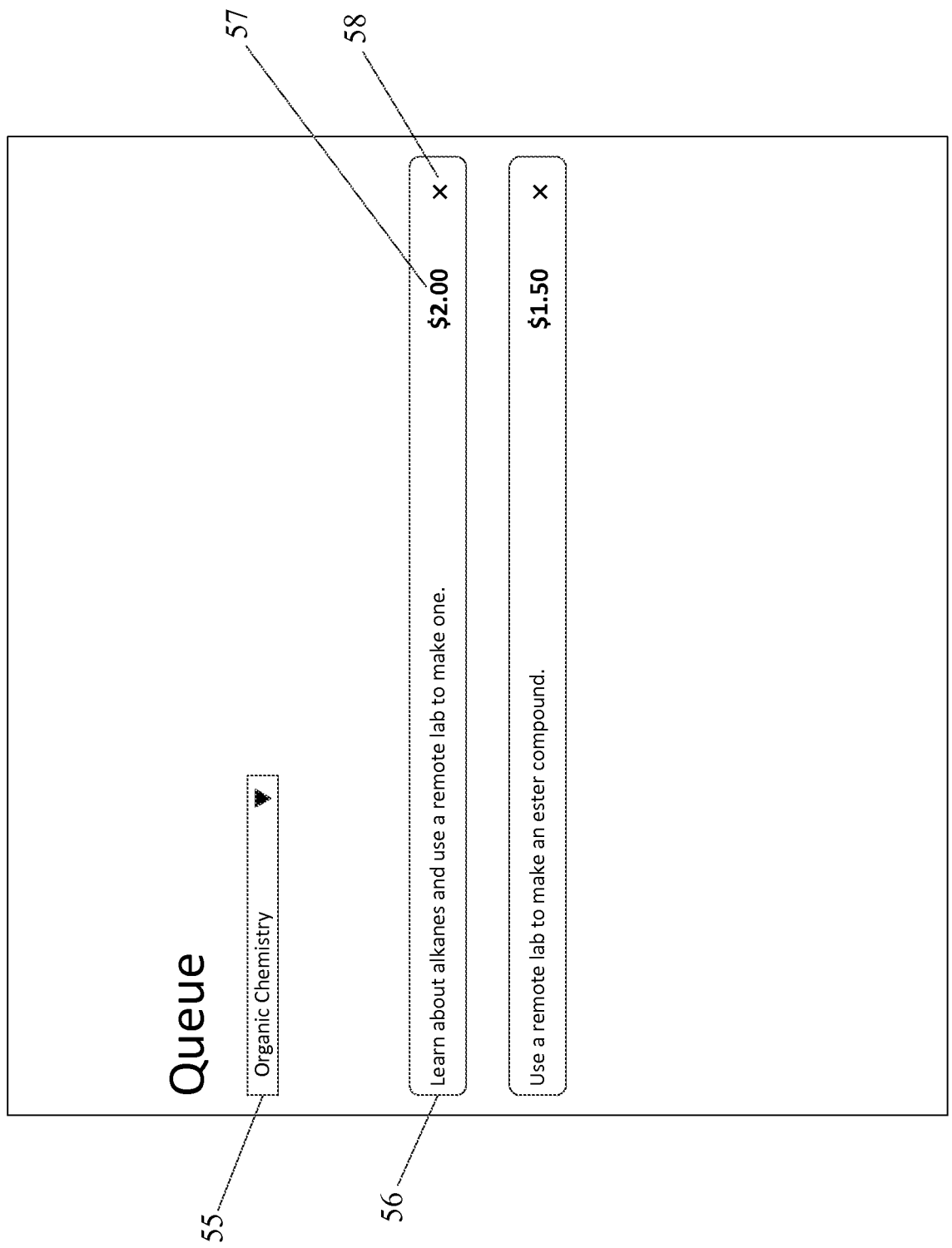
FIG. 14 illustrates a queue webpage for an embodiment of the invention.
Figure 17:
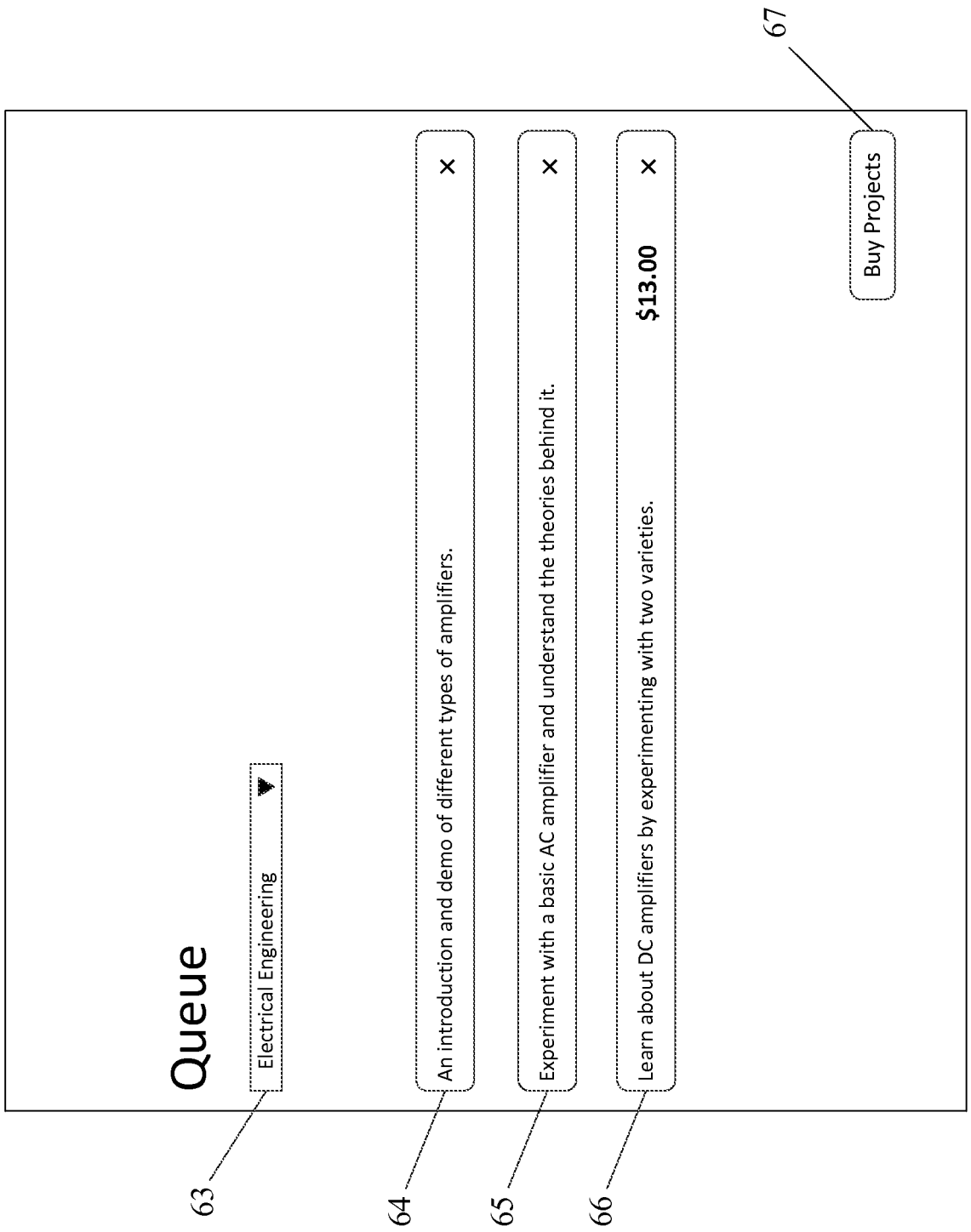
FIG. 17 is a diagram of a queue webpage for an embodiment of the invention.

Just as with the embodiment in organic chemistry, a user may add a search result to the queue by clicking on the Q button associated with that result. One such Q button 62 appears in FIG. 16. Results saved to the queue may be viewed by clicking the "Go to Queue" button 61, which displays the queue webpage. FIG. 17 is a diagram of a queue webpage for this embodiment. A discipline menu 63 indicates that the user is currently viewing the queue for electrical engineering. The user may alternately view the queues for various disciplines by clicking the menu and selecting a different discipline. For example, selecting "Organic Chemistry" from this menu will display a queue similar to the one in FIG. 14. In FIG. 14, the menu 55 indicates "Organic Chemistry" as the current discipline.

In the queue of FIG. 17, prices do not appear for the first two entries, 64 and 65, whereas the third entry 66 displays a price. The omission of price for some entries indicates that the user has previously purchased the sets of project resources associated with those entries. In contrast to projects in organic chemistry that typically utilize consumable project resources, projects in electrical engineering will ordinarily be executed with reusable hardware. Therefore, unlike with organic chemistry projects, it is not necessary for a user to repurchase project resources that are already in his inventory. The "Buy Projects" button 67 enables a user to purchase all or some of the project resources associated with entries in the queue. With the "Buy Projects" button, a user may purchase both project resources that have not been previously ordered and replacement project resources.

Pre-Built Projects in this Embodiment

The pre-built project associated with each topic page is a pre-manufactured printed circuit board (PCB). On and within each PCB are the electric circuits that demonstrate the principles examined in a corresponding multimedia presentation. Knobs, switches, connectors, sensors, and other interactive components on the PCB permit users to experiment with its circuits by making adjustments to settings. Additionally, the PCBs are equipped with an electrical interface to an instrumentation and control device, often designated as a data acquisition device (DAQ).

Figure 6:
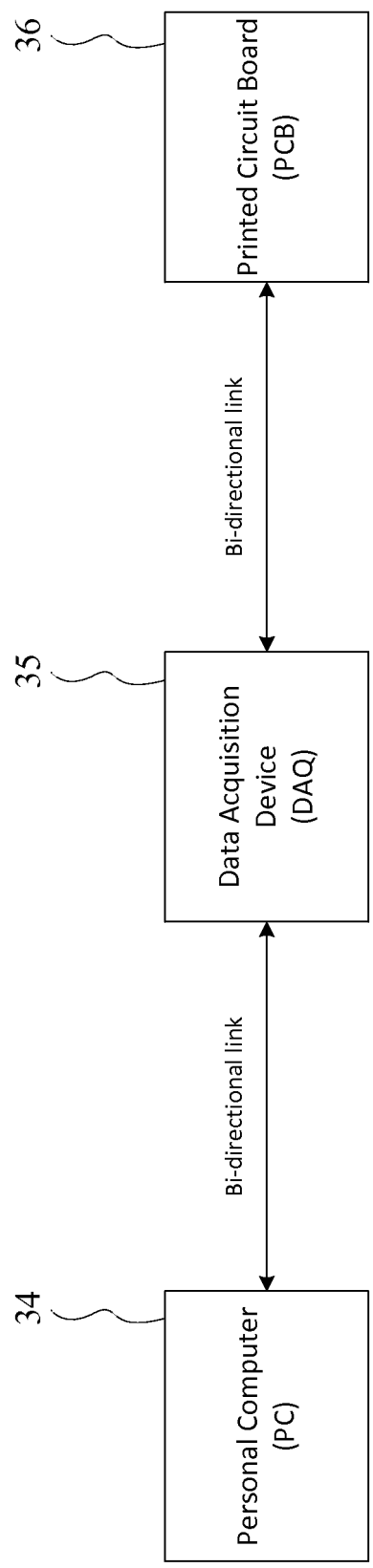
FIG. 6 is a block diagram of project resources for an embodiment of the invention in the discipline of electrical engineering.

Referring to FIG. 6, the DAQ 35 serves an interpreter between a PCB 36 and a personal computer (PC) 34. On the PC, users may perform electrical analyses on and control the connected PCB via the DAQ. Examples of analyses are voltage measurements, impedance measurements, oscilloscope functions, and sensor monitoring. Under direction of the PC, the DAQ interacts with a PCB by providing power, digital signals, and analog signals to the PCB's circuits. The DAQ also reads digital and analog signals from the PCB. With this arrangement, a user can observe and control on the PC otherwise imperceptible electrical phenomena that occur in the PCB's circuits.

With the "Rent Project" button 25 and the "Buy Project" button 26 in FIG. 4, users may rent or purchase, respectively, project resources for pre-built projects. In this embodiment of the invention, customers have the option of purchasing or renting a DAQ and PCBs.

In the case of procurement by rental, the DAQ and PCBs may be rented in a manner similar to renting DVDs online. Rented products are made available via local distributors. Customers pick up the products at customer-service locations; or alternatively, the distributors deliver the products to customers. As yet another alternative, products may be shipped to customers from central facilities and return-shipped by customers to the same facilities.

Customizable Projects in this Embodiment

Another aspect of this embodiment is an open source community that contributes customizable projects. Each contribution typically comprises circuit schematics, a description and instructions on the workings of the project, part lists, and photos or videos of the working device. These project documents are freely and publicly available to users of the curriculum via the website on which it resides. Using the CPT, customers may purchase the project resources specified in a parts list. End-users of customizable projects may modify the project schematics as desired to achieve preferred functionality. In contrast to the pre-built projects that are configured for pedagogical purposes, customizable projects may be designed for service in the real world. In this regard, implementing customizable projects generally results in standalone devices that operate without the DAQ and PC. Examples of customizable projects are scientific instrumentation, radios and transmitters, signal analyzers, security systems, optical data-routers, power supplies, etc.

Other Features of Various Embodiments of the Invention

Identifying and Accessing Precedent Topics

Any subject that is difficult or challenging to learn can be demystified. This outcome is achieved by first studying some rudimentary topics, and then progressing at a reasonable pace to more advanced topics, leading to mastery of the subject. In order to follow this process with minimal effort, a curriculum must be structured so that all the rudimentary or precedent topics for a given subject are easy to identify and access in a logical order. To repeat an illustration formerly described with the aid of FIG. 7, a learner who is having difficulty understanding positive exponentiation may choose to start with a precedent topic such as multiplication, addition, or counting, depending on what the learner has already grasped.

Accordingly, various embodiments of the invention provide learners with tools for identifying and accessing topics that are precedent to an end subject. In the embodiment described above for electrical engineering, an example was provided where the precedent topics for topic 1 in FIG. 1 were determined. These precedent topics and their relationship to topic 1 appear in FIG. 18. In general, any method by which a learner, via a computer user-interface, may observe and access in logical order the precedent topics for a given subject is a part of one or more embodiments of the invention.

Distinction from Prior and Non-Prior Art

This section distinguishes embodiments of the invention from specific prior art or existing art that is not prior art.

littleBits (http://littlebits.cc)

LittleBits ("littleBits") describes itself as an "opensource library of electronic modules that snap together with tiny magnets for prototyping and play." Although littleBits offers electronic kits for sale, it does not maintain a curricular collection of multimedia presentations that are deployed with inter-topic and intra-topic structure. On the website is an assortment of videos that are not particularly aimed at examining any STEM discipline. littleBits does not offer navigation tools that organize the videos into STEM topic categories. Therefore, users of the website are unable to locate and explore particular areas of a discipline. Further, the videos are not application driven and/or annotated as such. Additionally, the videos are not relevance-driven: that is, the videos are not organized in a sequence that corresponds to the precedence of the topics they each explore.

The littleBits videos typically show briefly a completed version of a project. They do not directly teach disciplinary principles nor provide instruction on executing the project. Instead, directions for completing the related project are provided as text on the webpage where each video appears.

Significantly, although a generic link to the littleBits online store is visible on each page, the webpage on which each video appears is not equipped with a method for procuring or selecting for procurement the particular sets of project resources shown in the video, as observed prior to Aug. 1, 2012. As observed on Jun. 16, 2013, at least some of the webpages now have an "Add to Cart" button for purchasing some project items displayed on the page.

Lacking the framework described for various embodiments of the invention, the littleBits approach does not achieve the substantial reductions in complexity and time commitment that is possible with embodiments of the invention.

Instructables (www.Instructables.com)

Instructables is not consistently a collection of slideshows or videos. In perhaps the majority of cases, lessons are a combination of long stretches of text and photographs, which are generally more time-consuming to traverse than are slideshows or videos. Instructables is best characterized as an assortment of explicatory documents prepared by a large and uncoordinated group of contributors. Consequently, it does not cover any particular discipline in an organized and thorough manner. In fact, it is designed as a platform for crowdsourcing and sharing projects. In that regard, the presentations are actually application driven, though not relevance-driven (no sequence of coordinated, independent presentations organized by precedence). A consequence of this absence of coordination is that extensive searching and previewing is required to locate documents on relevant topics, assuming they are available on the site. As an example, locating a document with basic (prerequisite) information in order to gain clarity on a more advanced concept that is discussed in another document can be comparatively very challenging.

Documents on instructables.com do not implement a uniform intra-topic structure similar to those in various embodiments of the invention. Costs and time information are generally not present, and when present are not conveyed via a structure that is uniform from one topic page to the next. As can be reasonably observed, cost and time information provided in an Instructables document are directed toward facilitating the particular project in question, as opposed to enabling a variety of real-world applications.

Even when some cost and time data appear in a document, no uniform navigation tools are provided to enable immediate access to this information from any location in the document. Along the same lines, the formatting of the documents lack consistency, thereby requiring time-consuming adaptation by the end-user to the style of each document.

Significantly, while in some documents hyperlinks are provided to vendor sites that sell project resources, no tools are provided for purchasing or selecting for purchase complete sets of project resources. Project items must be purchased individually or selected individually for purchase (that is, located and added to a virtual cart).

Overall, the absence of uniform methods on the Instructables website for accessing content and procuring project resources poses time-consuming complexity in learning and practicing the material.

Khan Academy (www.khanacademy.org)

Khan Academy provides lessons in a variety of STEM disciplines. A major distinction from various embodiments of the invention is that Khan Academy offers no procurement tools for acquiring project resources. In fact, a general observation is that lessons on Khan Academy do not employ hardware projects as teaching tools. Additionally, lessons are not application driven and/or annotated as such.

YouTube (www.youtube.com)

YouTube offers a platform on which a large, unrestricted, and uncoordinated group of users upload and share videos with other users. In that sense, YouTube as a whole is a random collection of videos. However, it does provide some topic navigation tools for narrowing the selection of videos by area of interest. Additionally, YouTube makes available channels that are maintained by particular individuals or organizations. These channels are often focused on a specific discipline. Channels or video series that are devoted to STEM topics are generally not application driven and/or annotated as such. Furthermore, these channels are not associated with project procurement tools for acquiring any hardware project resources that may be described in the lessons.

YouTube STEM videos are frequently not granular and generally do not present cost and time data; nor do they provide uniform tools for accessing such sections.

Redbox (www.redbox.com)

Redbox rents out DVD movies and video games via local vending-machines. No lesson-related hardware projects are made available for procurement. While the rented DVDs are hardware in the strictest sense, they are provided as a medium for disseminating content as opposed to hardware for performing physical experiments that are described in the presentations.

Redbox does not implement the inter-topic and intra-topic structure of embodiments of the invention. Particularly, navigation tools on rebox.com and at Redbox kiosks do not categorize presentations by STEM application areas, nor do they provide access to cost and time sections for each topic.

Howcast (www.howcast.com)

Howcast currently does not provide organized coverage of any STEM discipline but is rather a comparatively random collection of video series ("guides"). Howcast is generally application-driven and offers granular video lessons.

Video presentations in each guide are numbered sequentially, starting from 1. This numbering would suggest an order of precedence where viewing lower-numbered presentations is a prerequisite to understanding higher-numbered videos. In actuality, the numbering operates more as a reference value, rather than an indication of precedence. Many of the videos in a guide are prepared to be comprehensibly viewed in random order. Consequently, the order in which presentations must be viewed is unclear. For example, in a guide comprising sixty-five videos, it is not clear whether all the first sixty-four lessons must be covered before viewing the last video. With each video lasting about two minutes, a user of the guide has little choice but to spend over two hours viewing the first sixty-four lessons if she is to be sure not to overlook a foundational concept that is necessary for understanding the last presentation.

Furthermore, no precedence relationships are defined between the various guides. Therefore, it is unknown to learners whether the topics covered in one guide are prerequisite for understanding the topics examined in other guides. Learners must make this time-consuming determination on their own through trial and error.

Howcast video presentations do not have associated costs and time sections. Howcast does not provide project procurement tools.

Other Embodiments

Other embodiments of the invention that are different from those described in this patent application are possible within the scope of the claims; and the specific embodiments described do not limit the scope of the claims.

What is claimed is:

1. A process for designing and procuring project resources relevant to a curriculum that has internet presence, is accessible to end-users via a computer-user interface, and offers instruction in a particular STEM discipline, the process comprising:

a) making available to an end-user, via a computer user-interface, the subdivisions of said curriculum in the form of disparate topic categories, and identifying to said end-user the sub-disciplinary subject that each topic category teaches;

b) making available to said end-user, via a computer user-interface, a plurality of topics under each topic category for at least some of said disparate topic categories;

c) making available to said end-user a multimedia presentation that teaches each topic;

d) examining or demonstrating scientific, technological, engineering, or mathematical principles in the multimedia presentations of said curriculum;

e) associating each topic with one or more relevant sets of project resources, where each set of project resources in the curriculum comprises a physical element for performing a physical experiment or for instructively constructing a physical structure;
f) designing and associating a unique set of relevant project resources to each topic, for at least a subset of all topics of said curriculum;
g) enabling said end-user, via a computer user-interface, to select or identify any topic of interest from said curriculum, such that the set or sets of project resources that are associated with the selected or identified topic are distinguished from any other project resources of said curriculum;
h) providing said end-user with a method for procuring and utilizing only the distinguished set or sets of project resources; and
said end-user selecting or identifying a topic from said curriculum and employing said method for procuring and utilizing only the distinguished set or sets of project resources.

2. The process of claim 1, where:
a. a multimedia presentation of each curricular topic utilizes a project to demonstrate to said end-user how to achieve a particular objective or solve a particular problem;
b. said each curricular topic is associated with a set of project resources for practicing said project; and
c. said multimedia presentation is titled or annotated to accurately convey to said end-user, via a computer user-interface, the objective or problem it addresses.

3. The process of claim 1, where topics are substantially presented uniformly to said end-user by utilizing elements of intra-topic structure that include topic page, concept section, express project-procurement tool, and at least one of the following elements: costs section providing costs information for feasibility analysis of real-world technical projects related to the topic of the concept section, time section providing time information for feasibility analysis of real-world technical projects related to the topic of the concept section, and intra-topic navigation tool.

4. The process of claim 1, where the multimedia presentations are delivered in a stepwise manner, each step being sufficiently small to enable comprehension and, if applicable, emulation by the audience for which said curriculum is designed.

5. The process of claim 1, providing, via a computer user-interface, at least some of the features of a customizable-project tool to an extent necessary to achieve objectives of receiving project specifications from an open-source contributor and associating a set of project resources arising from said specifications to a topic of interest in said curriculum.

6. The process of claim 1, where at least one remote lab is a project resource.

7. The process of claim 1, where each set of project resources Includes at least one printed circuit board that is physically distributed to said end-user, and each printed circuit board comprises one or more adjustable components such that said end-user, by adjusting said components, may observe a phenomenon relevant to a curricular topic for which the printed circuit board is a project resource.

8. A process for designing and procuring project resources relevant to a curriculum that has internet presence, is accessible to end-users via a computer-user interface, and offers instruction in a particular STEM discipline, the process comprising:
a) making available to an end-user a multimedia presentation that teaches each topic;
b) utilizing a concept developed in a multimedia presentation of a more rudimentary topic as building block to teach a more advanced topic in another multimedia presentation;
c) utilizing only a subset of more rudimentary topics in said curriculum as building blocks to teach, via a multimedia presentation, a more advanced topic in said curriculum;
d) identifying to said end-user, via a computer user-interface, each more rudimentary topic in said curriculum that is utilized as building block to teach, via a multimedia presentation, a more advanced topic that is identified by said end-user;
e) examining or demonstrating scientific, technological, engineering, or mathematical principles in the multimedia presentations of said curriculum;
f) associating each topic with one or more relevant sets of project resources, where each set of project resources in the curriculum comprises a physical element for performing a physical experiment or for instructively constructing a physical structure;
g) designing and associating a unique set of relevant project resources to each topic, for at least a subset of all topics of said curriculum;
h) enabling said end-user, via a computer user-interface, to select or identify any topic of interest from said curriculum, such that the set or sets of project resources that are associated with the selected or identified topic are distinguished from any other project resources of said curriculum;
i) providing said end-user with a method for procuring and utilizing only the distinguished set or sets of project resources; and
j) said end-user selecting or identifying a topic from said curriculum and employing said method for procuring and utilizing only the distinguished set or sets of project resources.

9. The process of claim 8, where:
a. a multimedia presentation of each curricular topic utilizes a project to demonstrate to said end-user how to achieve a particular objective or solve a particular problem;
b. said each curricular topic is associated with a set of project resources for practicing said project; and
c. said multimedia presentation is titled or annotated to accurately convey to said end-user, via a computer user-interface, the objective or problem it addresses.

10. The process of claim 8, where topics are substantially presented uniformly to said end-user by utilizing elements of intra-topic structure that include topic page, concept section, express project-procurement tool, and at least one of the following elements: costs section providing costs information for feasibility analysis of real-world technical projects related to the topic of the concept section, time section providing time information for feasibility analysis of real-world technical projects related to the topic of the concept section, and intra-topic navigation tool.

11. The process of claim 8, where the multimedia presentations are delivered in a stepwise manner, each step being sufficiently small to enable comprehension and, if applicable, emulation by the audience for which said curriculum is designed.

12. The process of claim 8, providing, via a computer user-interface, at least some of the features of a customizable-project tool to an extent necessary to achieve objectives of receiving project specifications from an open-source contributor and associating a set of project resources arising from said specifications to a topic of interest in said curriculum.

13. The process of claim 8, where at least one remote lab is a project resource.

14. The process of claim 8, where each set of project resources includes at least one printed circuit board that is physically distributed to said end-user, and each printed circuit board comprises one or more adjustable components such that said end-user, by adjusting said components, may observe a phenomenon relevant to a curricular topic for which the printed circuit board is a project resource.

15. A method for assembling a collection of topics that are of interest to a specific end-user and for designing and procuring related project resources, where said method comprises the elements of:
   a) making available to said end-user, via a computer user-interface, a curriculum that has internet presence and that subdivides a particular STEM discipline into a multiplicity of randomly accessible topics;
   b) presenting at least some elements of a queue to said end-user that include a list associated with an account of said-user and a method to save one or more topics from a search result to said list;
   c) making available to said end-user a multimedia presentation that teaches each topic, where said multimedia presentation is a video, slideshow, and/or interactive image;
   d) utilizing a project in each multimedia presentation to demonstrate scientific, technological, engineering, or mathematical principles to said end-user;
   e) associating each topic with a set of project resources for practicing said project, where each set of project resources in the curriculum comprises a physical element for performing a physical experiment or for instructively constructing a physical structure;
   f) designing and associating a unique set of relevant project resources to each topic, for at least a subset of all topics of said curriculum;
   g) enabling said end-user, via a computer user-interface, to select or identify any topic of interest from said curriculum, such that the set or sets of project resources that are associated with the selected or identified topic are distinguished from any other project resources of said curriculum;
   h) providing said end-user with a method for procuring and utilizing only the distinguished set or sets of project resources; and
   i) said end-user selecting or identifying a topic from said curriculum and employing said method for procuring and utilizing only the distinguished set or sets of project resources.

16. The method of claim 15, where:
   a. a multimedia presentation of each curricular topic utilizes a project to demonstrate to said end-user how to achieve a particular objective or solve a particular problem;
   b. said each curricular topic is associated with a set of project resources for practicing said project; and
   c. said multimedia presentation is titled or annotated to accurately convey to said end-user, via a computer user-interface, the objective or problem it addresses.

17. The method of claim 15, where topics are substantially presented uniformly to said end-user by utilizing elements of intra-topic structure that include topic page, concept section, express project-procurement tool, and at least one of the following elements: costs section providing costs Information for feasibility analysis of real-world technical projects related to the topic of the concept section, time section providing time information for feasibility analysis of real-world technical projects related to the topic of the concept section, and intra-topic navigation tool.

18. The method of claim 15, providing, via a computer user-interface, at least some of the features of a customizable-project tool to an extent necessary to achieve objectives of receiving project specifications from an open-source contributor and associating a set of project resources arising from said specifications to a topic of interest in said curriculum.

19. The method of claim 15, where at least one remote lab is a project resource.

20. The method of claim 15, where each set of project resources includes at least one printed circuit board that is physically distributed to said end-user, and each printed circuit board comprises one or more adjustable components such that said end-user, by adjusting said components, may observe a phenomenon relevant to a curricular topic for which the printed circuit board is a project resource.

21. A system for obtaining topic-focused, applied instructional materials in a particular STEM discipline, the system comprising:
   a. a computing device configured to make available to an end-user, via a computer user-interface, a curriculum that subdivides the particular STEM discipline into a multiplicity of randomly accessible topics;
   b. said or another computing device configured to make available to said end-user a multimedia presentation that teaches each topic in said curriculum, where each presentation examines or demonstrates scientific, technological, engineering, or mathematical principles;
   c. a relevant set of project resources associated to each topic in said curriculum, where each set of project resources comprises a physical element for performing a physical experiment or for instructively constructing a physical structure;
   d. a unique set of project resources associated with and designed for teaching each topic or a subset of topics in said curriculum;
   e. said or another computing device configured to enable said end-user to select or identify, via a computer user-interface, any topic of interest from said curriculum, such that the set or sets of project resources that are associated with the selected or identified topic are distinguished from any other project resources of said curriculum;
   f. said or another computing device configured to enable said end-user to procure only said distinguished set or sets of project resources; and
   g. said distinguished set or sets of project resources utilized by said-end user after procurement.

\* \* \* \* \*